US012759949B2

(12) United States Patent
Decesare et al.

(10) Patent No.: US 12,759,949 B2
(45) Date of Patent: Oct. 13, 2026

(54) CERAMIC COMPOSITE COMPONENT

(71) Applicant: General Electric Company, Schenectady, NY (US)

(72) Inventors: Douglas Glenn Decesare, Queensbury, NY (US); Dane Michael Dale, Cincinnati, OH (US); Daniel Gene Dunn, Guilderland, NY (US); Henry Charles McGuigan, Duanesburg, NY (US); William Francis Navojosky, Ballston Spa, NY (US); Shantanu M. Sane, Niskayuna, NY (US); Reza Sarrafi-Nour, Clifton Park, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 260 days.

(21) Appl. No.: 18/429,686

(22) Filed: Feb. 1, 2024

(65) Prior Publication Data

US 2025/0250208 A1 Aug. 7, 2025

(51) Int. Cl.

*B32B 3/12* (2006.01)
*B32B 3/26* (2006.01)
(Continued)

(52) U.S. Cl.

CPC .............. *C04B 37/003* (2013.01); *B32B 3/12* (2013.01); *B32B 3/266* (2013.01); *B32B 18/00* (2013.01);
(Continued)

(58) Field of Classification Search

None
See application file for complete search history.

(56) References Cited

U.S. PATENT DOCUMENTS 3,533,712 A 10/1970 Kercher
4,465,725 A 8/1984 Riel
(Continued)

FOREIGN PATENT DOCUMENTS

CN 112620582 A 4/2021
FR 3044961 A1 6/2017
(Continued)

OTHER PUBLICATIONS

Extended European Search Report for application No. 25152139.9 dated Jun. 26, 2025, 8 pages.

*Primary Examiner* — Elizabeth Collister
(74) *Attorney, Agent, or Firm* — Carter, DeLuca & Farrell, LLP

(57) ABSTRACT

A ceramic composite component includes a ceramic core structure having a plurality of hollow cells defined by a plurality of walls extending from a first side of the ceramic core structure to a second side of the ceramic core structure. A ceramic matrix composite (CMC) structure is coupled to the ceramic core structure and includes a plurality of CMC plies. The CMC structure is defined by a first side of the CMC structure and a second side of the CMC structure, the second side of the CMC structure opposite the first side of the CMC structure. A first CMC face sheet is bonded to the first side of the ceramic core structure and the first side of the CMC structure. A second CMC face sheet is bonded to the second side of the ceramic core structure and the second side of the CMC structure.

20 Claims, 14 Drawing Sheets

(51) Int. Cl.

| | |
|---|---|
| ***B32B 18/00*** | (2006.01) |
| ***C04B 35/80*** | (2006.01) |
| ***C04B 37/00*** | (2006.01) |
| ***C04B 38/00*** | (2006.01) |
| *F01D 5/28* | (2006.01) |

(52) U.S. Cl.

CPC .......... *C04B 35/80* (2013.01); *C04B 38/0022* (2013.01); *B32B 2603/00* (2013.01); *B32B 2605/18* (2013.01); *C04B 2237/38* (2013.01); *C04B 2237/62* (2013.01); *C04B 2237/84* (2013.01); *F01D 5/282* (2013.01); *F05D 2230/23* (2013.01); *F05D 2300/6033* (2013.01)

(56) References Cited

U.S. PATENT DOCUMENTS

| | | | |
|---|---|---|---|
| 4,836,084 | A | 6/1989 | Vogelesang et al. |
| 5,594,216 | A | 1/1997 | Yasukawa et al. |
| 6,122,892 | A | 9/2000 | Gonidec et al. |
| 6,480,540 | B1 | 11/2002 | Guillotel |
| 6,607,625 | B2 | 8/2003 | Andre et al. |
| 6,984,100 | B2 | 1/2006 | Bunker et al. |
| 7,435,053 | B2 | 10/2008 | Liang |
| 7,670,113 | B1 | 3/2010 | Liang |
| 8,167,537 | B1 | 5/2012 | Plank et al. |
| 8,640,825 | B2 | 2/2014 | Vauchel et al. |
| 8,899,512 | B2 | 12/2014 | Vauchel et al. |
| 9,108,385 | B2 | 8/2015 | Deschamps et al. |
| 9,469,985 | B1 | 10/2016 | Ichihashi |
| 9,545,774 | B1 | 1/2017 | Heng et al. |
| 9,683,443 | B2 | 6/2017 | Freeman et al. |
| 9,741,331 | B1 | 8/2017 | Alam et al. |
| 10,174,621 | B2 | 1/2019 | Burd |
| 10,174,675 | B2 | 1/2019 | Martinez et al. |
| 10,260,354 | B2 | 4/2019 | Bunker |
| 10,287,894 | B2 | 5/2019 | Dutta et al. |
| 10,384,981 | B2 | 8/2019 | Hall et al. |
| 10,472,973 | B2 | 11/2019 | Dutta et al. |
| 10,577,943 | B2 | 3/2020 | Marinelli et al. |
| 10,583,489 | B2 | 3/2020 | Morgan et al. |
| 10,590,776 | B2 | 3/2020 | Dutta et al. |
| 10,794,246 | B2 | 10/2020 | Leyko et al. |
| 11,021,971 | B2 | 6/2021 | Holowczak et al. |
| 11,047,240 | B2 | 6/2021 | Frey et al. |
| 11,047,304 | B2 | 6/2021 | Lin et al. |
| 2009/0004425 | A1 | 1/2009 | Lehman et al. |
| 2009/0324878 | A1 | 12/2009 | Steibel et al. |
| 2010/0104446 | A1 | 4/2010 | Vehr et al. |
| 2011/0229337 | A1 | 9/2011 | Carper et al. |
| 2013/0294891 | A1 | 11/2013 | Neuhaeusler et al. |
| 2016/0003106 | A1* | 1/2016 | Fouquet ............... G10K 11/172 427/255.12 |
| 2017/0009600 | A1 | 1/2017 | Grasso et al. |
| 2017/0072656 | A1* | 3/2017 | Dodworth ............. B29C 70/345 |
| 2018/0065337 | A1 | 3/2018 | Grasso et al. |
| 2018/0166058 | A1 | 6/2018 | Delehouze et al. |
| 2019/0040742 | A1* | 2/2019 | Roberts ................... F01D 5/005 |
| 2020/0299200 | A1 | 9/2020 | Sheedy et al. |
| 2020/0309029 | A1 | 10/2020 | Boileau et al. |
| 2021/0001511 | A1 | 1/2021 | Jin et al. |
| 2021/0079885 | A1 | 3/2021 | Arce et al. |
| 2021/0156265 | A1 | 5/2021 | Rathay et al. |
| 2021/0189886 | A1 | 6/2021 | Dyson et al. |
| 2021/0189901 | A1 | 6/2021 | Dyson et al. |
| 2021/0254475 | A1 | 8/2021 | Dyson et al. |
| 2021/0390940 | A1 | 12/2021 | Desjoyeaux et al. |
| 2024/0375394 | A1* | 11/2024 | Kim .......................... B32B 9/04 |
| 2024/0401485 | A1* | 12/2024 | Kim ........................ F01D 5/147 |

FOREIGN PATENT DOCUMENTS

| | | | |
|---|---|---|---|
| GB | 2532704 | A | 6/2016 |
| RU | 2720151 | C1 | 4/2020 |
| WO | WO2019179702 | A1 | 9/2019 |
| WO | WO2021/067978 | A1 | 4/2021 |

* cited by examiner

CERAMIC COMPOSITE COMPONENT

FIELD

The present subject matter relates generally to components and processes of fabricating components, or more particularly to ceramic composite components.

BACKGROUND

Silicon carbide (SiC)-based ceramic matrix composite (CMC) materials have been proposed as materials for certain components of various types of aerospace structures. Various methods are known for fabricating SiC-based components, including melt infiltration (MI), chemical vapor infiltration (CVI), and polymer inflation pyrolysis (PIP) methods. Though these fabrication techniques differ significantly from each other, each involves the use of hand lay-up and tooling or dies to produce a near-net-shape part through a method that includes the application of heat at various method stages.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
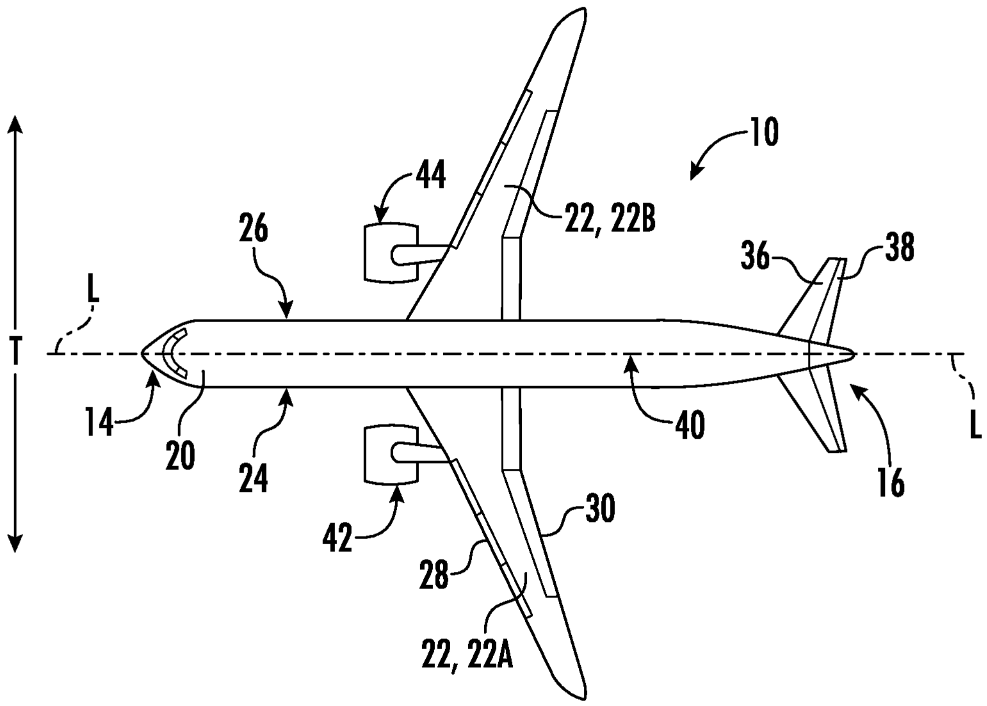
FIG. 1 is a top view of an aerospace structure according to various exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms “first”, “second”, and “third” may be used interchangeably to distinguish one component from another and are not intended to signify location or importance of the individual components.

The terms "forward" and "aft" refer to relative positions of an aircraft or vehicle, and refer to the normal operational attitude of the aircraft or vehicle. For example, with regard to an aircraft, forward refers to a position closer to a nose of the aircraft and aft refers to a position closer to a tail of the aircraft.

The terms "upstream" and "downstream" refer to the relative direction with respect to fluid flow. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. For example, in exemplary embodiments, bundles of the fibers, which may include a ceramic refractory material coating, are formed as a reinforced tape, such as a unidirectional reinforced tape. A plurality of the tapes may be laid up together (e.g., as plies) to form a preform component (e.g., forming ceramic matrix composite structure 300). The bundles of fibers may be impregnated with a slurry composition prior to forming the preform (e.g., prepreg plies) or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components and components of other aerospace propulsion systems and vehicle structures used in their higher temperature sections, such as airfoils (e.g., turbines, and vanes), combustors, shrouds and other like components, nozzles, transition ducts, thermal protection systems (TPS), aerodynamic control surfaces and leading edges that would benefit from the lighter-weight and higher temperature capability these materials can offer.

In some embodiments, the present disclosure includes composite panels or components having a plurality of "internal structures" such as hollow cells, channels, struts, lattice structures, cavities and other structural and/or functional elements. While ceramic composite materials provide good toughness, high thermal insulation, high-temperature strength, and chemical stability in a broad range of operating environments, the raw material and processing techniques can become expensive. Current structures capable of withstanding extreme operation conditions may be bulky, expensive, or have short lifespans. Accordingly, lighter, stronger, and more cost-effective structures are highly desirable in the art and can enable a broader range of applications. Composite panels with internal cellular structures such as honeycomb or similar configuration of cells can provide for similar properties while reducing weight of the component, and notably, the amount of CMC material used in the component. However, the relatively thin walls of the core structure provides limited bonding area to connect the core structure with one or more face sheets.

In exemplary embodiments, the present disclosure provides a pliable matrix material utilized to bond the various components together. The pliable matrix material can comprise reinforcement material, such as materials similar to those in the adjacent components, to provide similar and compatible properties throughout the composite panel or structure. Moreover, the flexible application of the pliable matrix material can provide enhanced bonding capability between a core structure and the composite face sheet or composite back sheet by accommodating dimensional mismatches between individual components.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure.

As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, or precursors for ultra-high-temperature ceramics, such as polymeric precursors. Each successive layer may be, for example, between about 10 μm and 200 μm, although the thickness may be determined based on any number of parameters and may be any suitable size.

Embodiments of the present disclosure provide a CMC sandwich structure suitable for high-temperature, high-specific-stiffness, applications including, by way of non-limiting example, aerodynamic control surfaces such as tail fins, flaps, flaperons, and elevons, and re-entry vehicle structures where the structure surface is exposed to very high temperatures during reentry or flight. Various embodiments of the present disclosure may be incorporated into vehicles configured for subsonic, transonic, supersonic, or hypersonic speeds such as, by non-limiting example, missiles and various types of aerospace vehicles such as airplane-like space crafts. In exemplary embodiments, a CMC sandwich structure includes a monolithic ceramic core structure configured for multiple functionalities. By way of non-limiting examples, such a monolithic core structure has a higher thermal conductivity when compared to traditional CMC materials. Accordingly, embodiments of the present disclosure enable alterations to the structure to optimize the thermal response both locally and at a bulk level. Additionally, the monolithic material has a greater stiffness when compared to traditional CMC materials, and the additive manufacturing of the monolithic core structure enables optimization of local stiffness as well as the overall stiffness of the structure. High-temperature CMC layers are laminated to the monolithic core structure to form the CMC sandwich structure. The monolithic core structure may be a printed or machined or fabricated by other known means using a monolithic ceramic as a single- or multi-segmented core to achieve an overall aerodynamic structure. The core or the core segments may include regions of or features for integration and joining with CMC plies and elements within the structure for enhanced functional performance and reliability. For example, in exemplary embodiments, a single-piece monolithic core may include: pockets and interlocking features for internal attachment or for placement of CMC plies or CMC inserts; aerodynamically shaped leading edges with interior edges for CMC face sheet ply arrangements; a backbone skeleton of differently shaped walls to manage local structural rigidity; and mating features to accommodate joining with the monolithic ceramic core structure.

As used herein, the term "subsonic" refers to speeds of less than the speed of sound of less than about Mach 1. As used herein, the term "transonic" refers to speeds of about Mach 0.8 to about Mach 1.2. As used herein, the term "supersonic" refers to speeds greater than the speed of sound and more specifically, speeds of about Mach 1 to about Mach 5. As used herein, the term "hypersonic" refers to speeds of about Mach 5 and above.

Figure 2:
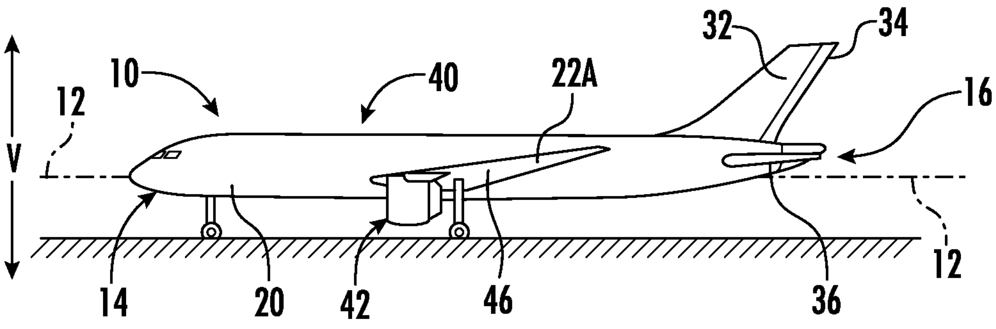
FIG. 2 is a port side view of the exemplary aerospace structure of FIG. 1.

Referring now to the drawings, wherein identical numerals indicate the same elements throughout the figures, FIG. 1 provides a top view of an exemplary aerospace vehicle in the form of an aircraft 10 that may incorporate various embodiments of the present disclosure, and FIG. 2 provides a port side 24 view of the aircraft 10 as illustrated in FIG. 1. Although FIGS. 1 and 2 depict an aerospace vehicle generally configured for subsonic speeds, it should be understood that various embodiments of the present disclosure may incorporated into aerospace vehicles configured for subsonic, transonic, supersonic, or hypersonic speeds, or re-entry conditions in earth and other atmosphere conditions such as, by non-limiting example, missiles and various types of aerospace vehicles such as airplane-like space crafts.

As shown in FIGS. 1 and 2 collectively, the aircraft 10 defines a longitudinal direction L that extends therethrough, a vertical direction V, a transverse direction T, a forward end 14, and an aft end 16. Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from the port side 24 of the fuselage 20. Further, the second wing 22B similarly extends outwardly from the fuselage 20, generally along the transverse direction T with respect to the longitudinal direction L, from a starboard side 26 of the fuselage 20. Each of the wings 22A, 22B generally includes a wing body 46. The fuselage 20 additionally includes an outer surface 40.

The aircraft 10 further includes a number of control surfaces used for a particular aircraft 10 maneuver or operation. Such control surfaces may be referred to as tail fins, stabilizers, flaps, flaperons, elevons, etc. For example, each of the wings 22A, 22B for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. However, it should be appreciated that in other exemplary embodiments of the present disclosure, the aircraft 10 may additionally or alternatively include any other suitable configuration of control surfaces that may or may not extend directly along the vertical direction V or horizontal/transverse direction T. In addition, alternative control surfaces may be any suitable shape, size, configuration, or orientation while remaining within the scope of the present subject matter.

The exemplary aircraft 10 of FIGS. 1 and 2 also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. It should also be understood that embodiments of the present disclosure may be incorporated into other types of propulsion systems such as, by way of non-limiting example, ramjet or supersonic combustion ramjet (SCRAM) engines.

Figure 3:
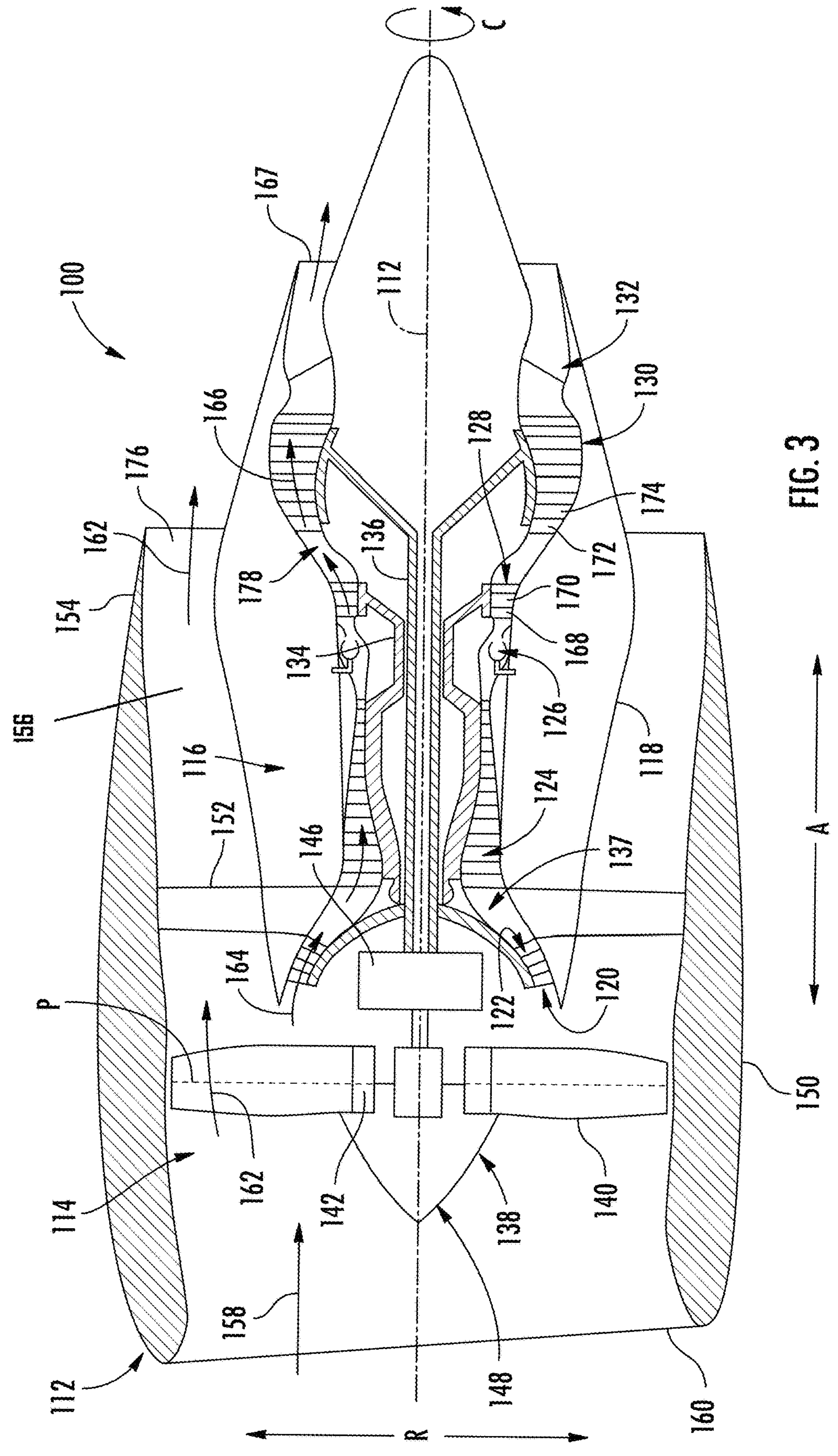
FIG. 3 is a schematic, cross-sectional view of a gas turbine engine in accordance with an exemplary embodiment of the present disclosure.

One or both of the first and second aircraft engines 42, 44 of the exemplary aircraft 10 described in FIGS. 1 and 2 may be configured in substantially the same manner as an exemplary gas turbine engine 100 of FIG. 3. More particularly, for the embodiment of FIG. 3, the gas turbine engine 100 is a high-bypass turbofan jet engine, sometimes also referred to as a "turbofan engine." As shown in FIG. 3, the gas turbine engine 100 defines an axial direction A (extending parallel to a longitudinal centerline 112 provided for reference), a radial direction R, and a circumferential direction C extending about the longitudinal centerline 112. In general, the gas turbine engine 100 includes a fan section 114 and a turbomachine 116 disposed downstream from the fan section 114.

The exemplary turbomachine 116 depicted generally includes a substantially tubular outer casing or core cowl 118 that defines an annular engine inlet 120. The core cowl 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft 134 (which may additionally or alternatively be a spool) drivingly connects the HP turbine 128 to the HP compressor 124. A low pressure (LP) shaft 136 (which may additionally or alternatively be a spool) drivingly connects the LP turbine 130 to the LP compressor 122. The compressor section, combustion section 126, turbine section, and jet exhaust nozzle section 132 together define a working gas flowpath 137.

For the embodiment depicted, the fan section 114 includes a fan 138 having a plurality of fan blades 140 coupled to a disk 142 in a spaced apart manner. As depicted, the fan blades 140 extend outwardly from disk 142 generally along the radial direction R. The gas turbine engine 100 further includes a power gear box 146, and the fan blades 140 and the disk 142 are together rotatable about the longitudinal centerline 112 by LP shaft 136 across the power gear box 146. The power gear box 146 includes a plurality of gears for adjusting a rotational speed of the fan 138 relative to a rotational speed of the LP shaft 136, such that the fan 138 may rotate at a more efficient fan speed.

Referring still to the exemplary embodiment of FIG. 3, the disk 142 is covered by a rotatable front hub 148 of the fan section 114 (sometimes also referred to as a "spinner"). The front hub 148 aerodynamically contoured to promote an airflow through the plurality of fan blades 140.

Additionally, the exemplary fan section 114 includes an annular fan casing or outer nacelle 150 that circumferentially surrounds the fan 138 and/or at least a portion of the turbomachine 116. It should be appreciated that the nacelle 150 is supported relative to the turbomachine 116 by a plurality of circumferentially-spaced outlet guide vanes 152 in the embodiment depicted. Moreover, a downstream section 154 of the nacelle 150 extends over an outer portion of the turbomachine 116 so as to define a bypass airflow passage 156 therebetween.

During operation of the gas turbine engine 100, a volume of air 158 enters the gas turbine engine 100 through an associated inlet 160 of the nacelle 150 and fan section 114. As the volume of air 158 passes across the fan blades 140, a first portion of air 162 is directed or routed into the bypass airflow passage 156 and a second portion of air 164 is directed or routed into the working gas flowpath 137, or more specifically into the LP compressor 122. The ratio between the mass flow rates of the first portion of air 162 and the second portion of air 164 is commonly known as a bypass ratio. A pressure of the second portion of air 164 is then increased as it is routed through the HP compressor 124 and into the combustion section 126, where it is mixed with fuel and burned to provide combustion gases 166.

The combustion gases 166 are routed through the HP turbine 128 where a portion of thermal and/or kinetic energy from the combustion gases 166 is extracted via sequential stages of HP turbine stator vanes 168 that are coupled to the outer casing 118 and HP turbine rotor blades 170 that are coupled to the HP shaft 134, thus causing the HP shaft 134 to rotate, thereby supporting operation of the HP compressor 124. The combustion gases 166 are then routed through the LP turbine 130 where a second portion of thermal and kinetic energy is extracted from the combustion gases 166 via sequential stages of LP turbine stator vanes 172 that are coupled to the outer casing 118 and LP turbine rotor blades 174 that are coupled to the LP shaft 136, thus causing the LP shaft 136 to rotate, thereby supporting operation of the LP compressor 122 and/or rotation of the fan 138.

The combustion gases 166 are subsequently routed through the jet exhaust nozzle section 132 and exits the core cowl 118 through a core nozzle 167 of the turbomachine 116 to provide propulsive thrust. Simultaneously, the pressure of the first portion of air 162 is substantially increased as the first portion of air 162 is routed through the bypass airflow passage 156 before it is exhausted from a fan exhaust nozzle section 176 of the gas turbine engine 100, also providing propulsive thrust. The HP turbine 128, the LP turbine 130, and the jet exhaust nozzle section 132 at least partially define a hot gas path 178 for routing the combustion gases 166 through the turbomachine 116.

It should be appreciated, however, that the exemplary gas turbine engine 100 depicted in FIG. 3 is by way of example only, and that in other exemplary embodiments, the gas turbine engine 100 may have any other suitable configuration. For example, although the gas turbine engine 100 depicted is configured as a geared gas turbine engine (i.e., including the power gear box 146), in other embodiments, the gas turbine engine 100 may additionally or alternatively be configured as a direct drive gas turbine engine (such that the LP shaft 136 rotates at the same speed as the fan 138). It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboshaft gas turbine engine, or a turbojet gas turbine engine. It should be understood that engine 100 may also comprise other types of propulsion systems, such as a hybrid-electric turbofan engine or an electric propulsion system, and can include an electrically driven fan. It should be understood that various embodiments of the present disclosure may incorporated into various components of the gas turbine engine 100 such as, by way of non-limiting example, the core nozzle 167, the low pressure turbine 130, and the jet exhaust nozzle section 132, including exhaust flap seals and similar structures.

Figure 4:
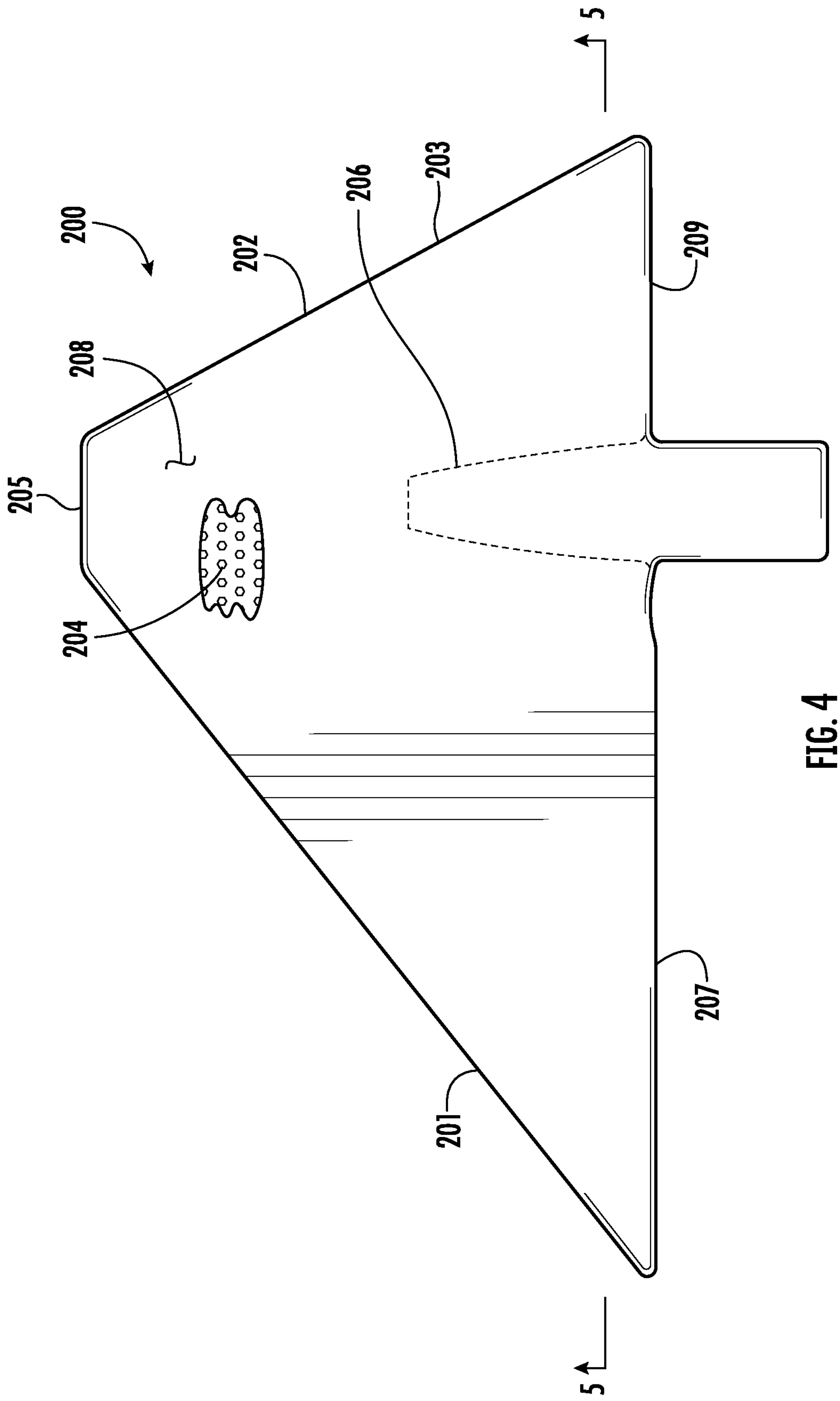
FIG. 4 is a schematic, plan view of an exemplary ceramic composite component in accordance with an embodiment of the present disclosure.

Referring to FIG. 4, a ceramic composite component 200 is depicted in an assembled configuration, and the ceramic composite component 200 is in the form of a tail fin 202. For example, the tail fin 202 may be used on or otherwise form part of the aircraft 10 depicted in FIGS. 1 and 2. For example, the tail fin 202 may have a leading edge 201, a trailing edge 203, and one or more side edges 205, 207, and 209. However, it should be understood that other types of control surfaces or control surface structures, or other types of structures and components in general, may be formed without departing from the present disclosure. In the illustrated embodiment, the ceramic composite component 200 includes a ceramic core structure 204, a CMC structure 206, and one or more CMC face sheets 208 disposed over and bonded to the ceramic core structure 204 and the CMC structure 206. In the illustrated embodiment, the CMC structure 206 extends outwardly beyond the side edges 207 and 209 to facilitate the coupling of the tail fin 202 to another structure. Similarly, the CMC structure 206 may be formed as a "receiving" or "receptor" internal structure to couple the ceramic composite component 200 to another structure via accepting a shaft or other forms of coupling.

The ceramic core structure 204 may comprise a different material compared to the CMC face sheet 208 or the CMC structure 206. By way of non-limiting example, the ceramic core structure 204 may be such as a material that is less dense than the material of the CMC face sheet 208 or the CMC structure 206. In some embodiments, the ceramic core structure 204 may include a foam core or other porous ceramic material core. However, even when the material of the ceramic core structure 204 is different, it is compatible with the CMC face sheet 208 or the CMC structure 206 to produce a sufficient bond between the components, including in extreme operating conditions such as high temperatures. In exemplary embodiments, the ceramic core structure 204 may include silicon carbide (SiC) or silicon (Si) (e.g., unreinforced).

Figure 5:
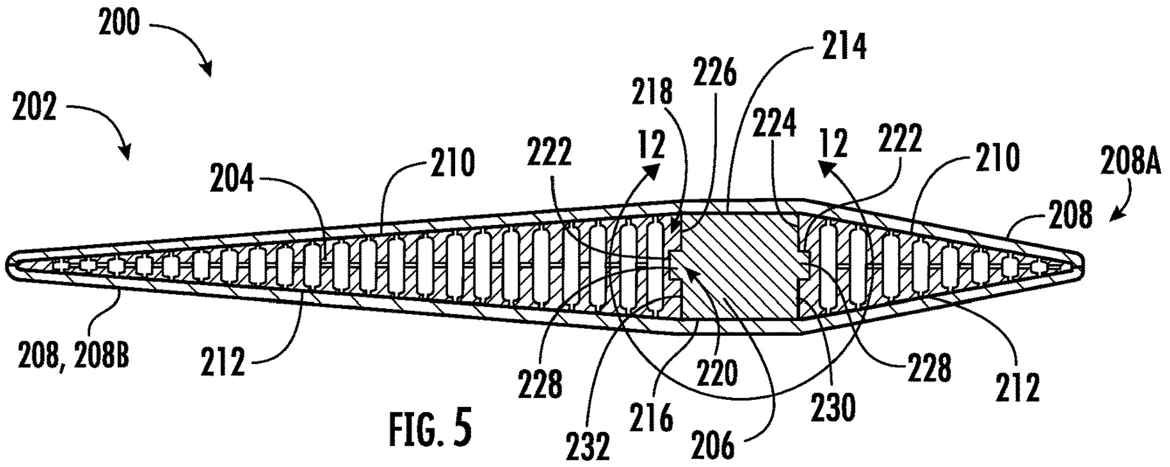
FIG. 5 is a schematic, cross-sectional view of the exemplary ceramic composite component of FIG. 4 taken along the line 5-5 of FIG. 4 in accordance with an embodiment of the present disclosure.

In the embodiment illustrated in FIG. 5, the CMC face sheet 208 is bonded to an exterior surface of the ceramic composite component 200. For example, referring to FIG. 5, the CMC face sheet 208A is bonded to a side 210 of the ceramic core structure 204. For illustrative purposes and ease of clarity, the side 210 may also be referred to as the side 210. The CMC face sheet 208B is also bonded to a side 212 of the ceramic core structure 204 opposite the side 210. For illustrative purposes and case of clarity, the side 212 may also be referred to as the bottom side 212. The CMC face sheet 208A is also bonded to a side 214 of the CMC structure 206. For illustrative purposes and ease of clarity, the side 214 of the CMC structure 206 may also be referred to as the top side 214 of the CMC structure 206. The CMC face sheet 208B is also bonded to a side 216 of the CMC structure 206 opposite the side 214. For illustrative purposes and ease of clarity, the side 216 of the CMC structure 206 may also be referred to as the bottom side 216 of the CMC structure 206. It should be understood that the CMC face sheet 208 may also extend and be bonded to other surfaces or sides of the ceramic core structure 204 and the CMC structure 206 not depicted in FIG. 5. It should also be understood that the CMC face sheet 208 may comprise one or more CMC face sheets 208 such that the one or more CMC face sheets 208 comprise different CMC face sheet 208 portions or segments, continuous or discontinuous relative to each other, that are disposed over different surfaces of the ceramic core structure 204 and the CMC structure 206 (e.g., on the same side or different sides of the ceramic core structure 204 and the CMC structure 206).

In the illustrated embodiment, the CMC structure 206 is provided, disposed, or otherwise embedded in the ceramic core structure 204. For example, in FIG. 5, the CMC structure 206 is formed in the shape of a shaft such that the side 214 of the CMC structure 206 where it meets the adjacent side 210 of the ceramic core structure 204, aligns with or is flush with the adjacent side 210. Similarly, the CMC structure 206 is formed such that its side 216, where the side 216 meets the adjacent side 212 of the ceramic core structure 204, aligns with or is flush with the adjacent side 212. It should be understood that the sides 210 and 214 and the sides 212 and 216 may comprise profiles or geometries to meet a particular design requirement of the ceramic composite component 200.

In the illustrated embodiment, the ceramic core structure 204 includes an interlocking feature 218 that engages a corresponding and geometrically complementary interlocking feature 220 formed on the CMC structure 206. For example, in the illustrated embodiment, the interlocking feature 218 includes a pair of recesses 222 each formed in a respective sidewall 224 and 226 of the ceramic core structure 204. The interlocking feature 220 includes a pair of protrusions 228 each formed in or extending outwardly from a respective sidewall 230 and 232 of the CMC structure 206. In operation, the interlocking features 218 and 220 engage each other to prevent undesirable separation of the CMC structure 206 from the ceramic core structure 204. The interlocking features 218 and 220 may comprise other types of geometric features such as, but not limited to, a dovetail, mortise and tenon, keyhole, or other type of retention geometry.

The CMC structure 206 can also be bonded to the ceramic core structure 204. For example, in exemplary embodiments, as will be described in greater detail below, a pliable matrix material or other material or method may be used at component interfaces to bond the CMC structure 206 to the ceramic core structure 204.

Figure 6:
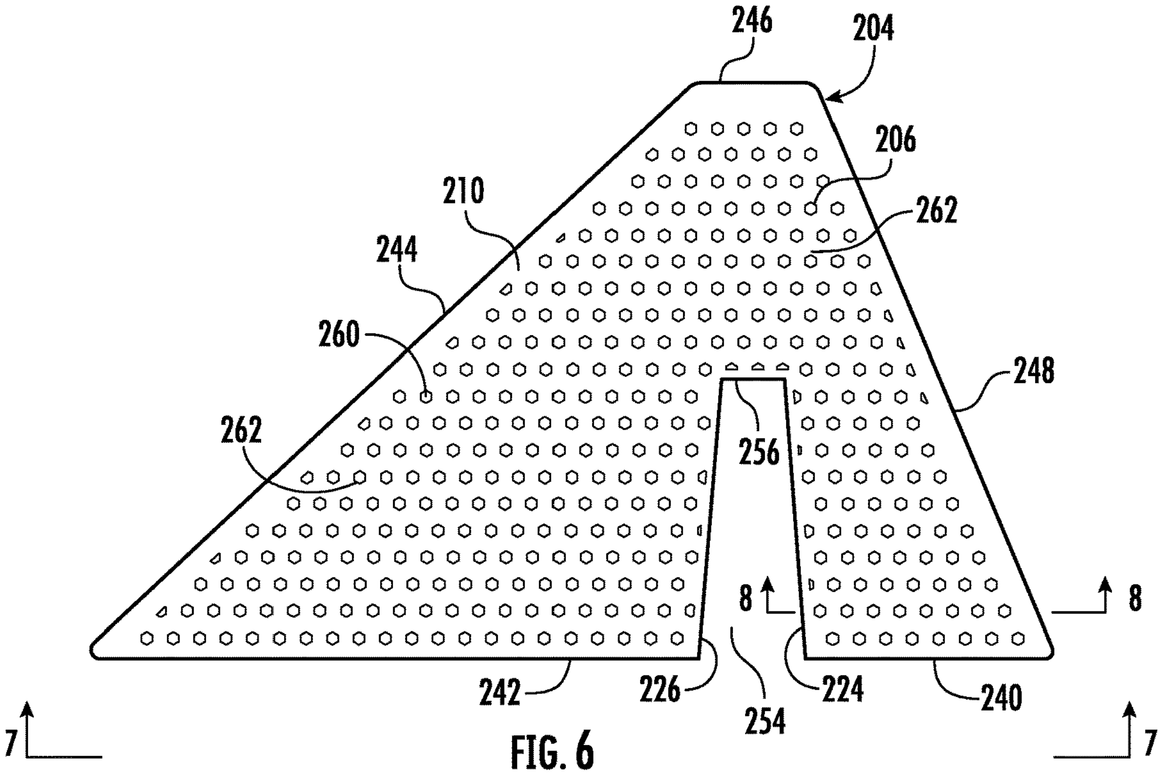
FIG. 6 is a schematic, plan view of an exemplary ceramic core structure of the exemplary ceramic composite component of FIG. 4 in accordance with an embodiment of the present disclosure.

In exemplary embodiments, the ceramic core structure 204 comprises a monolithic ceramic core structure 204 such that the ceramic core structure 204 is formed without reinforcing fibers. By way of further non-limiting example, the ceramic core structure 204 can be additively manufactured structured. In exemplary embodiments, the ceramic core structure 204 can be a honeycomb structure. In exemplary embodiments, the ceramic core structure 204 is made of Si or SiC. It should be understood that the ceramic core structure 204 may comprise other types of cellular configurations. Referring to FIG. 6, it can be seen that an outer perimeter or boundary of the ceramic core structure 204 is defined by sidewalls 240, 242, 244, 246, and 248. The ceramic core structure 204 includes a recessed portion 254 sized and configured to receive the CMC structure 206 (FIG. 5). In the illustrated embodiment, the recessed portion 254 is defined by the sidewalls 224 and 226, and by a sidewall 256, each extending from the side 210 to the side 212. The recessed portion 254 extends inward from the sidewalls 240 and 242 (e.g., the sidewall 226 extending inward from the sidewall 242, and the sidewall 224 extending inward from the sidewall 240) to an interior area or portion of the ceramic core structure 204. In exemplary embodiments, the ceramic core structure 204 may be formed as a monolithic unitary core structure. The ceramic core structure 204 comprises a plurality of hollow cells 260 defined by a plurality of walls 262 extending from the side 210 of the ceramic core structure 204 to the side 212 of the ceramic core structure 204 opposite the side 210. Each of the plurality of hollow cells 260 that form the ceramic core structure 204 can extend in a parallel direction with one another. Moreover, the side 210 and the side 212 may be planar or non-planar, have planar and non-planar segments, or have a combination of planar and non-planar geometries. In the illustrated embodiment of FIG. 7, the side 210 and the side 212 are tapered in one or more directions to produce aerodynamic surfaces on the side 210 and the side 212.

Figure 8:
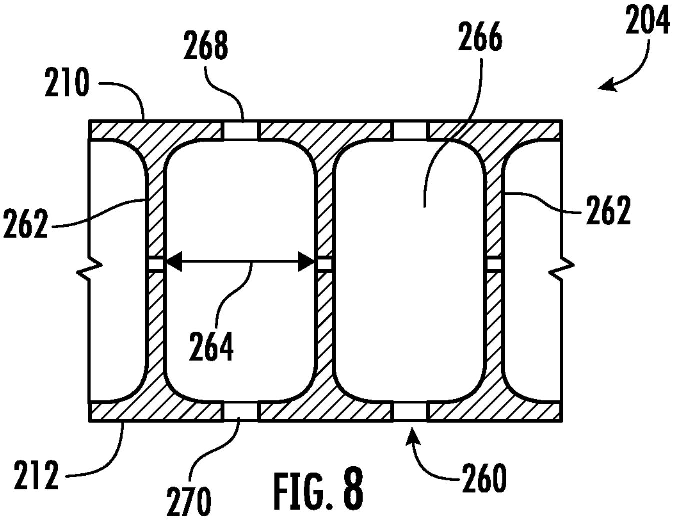
FIG. 8 is a schematic, partial cross-sectional view of the exemplary ceramic core structure of FIG. 6 taken along the line 8-8 of FIG. 6 in accordance with an embodiment of present disclosure.

As illustrated in FIG. 8, the plurality of walls 262 of the plurality of hollow cells 260 define the shape, and more specifically, the cross-sectional geometry 264, of each of the plurality of hollow cells 260. That is, the plurality of walls 262 create a partially closed structure (i.e., enclosed by the plurality of walls 262 on the side but potentially open on the ends at the side 210 or the side 212) to define a hollow interior 266 to form the cross-sectional geometry 264 for each of the plurality of cells 260. As used herein, the cross-sectional geometry 264 refers to the open, or closed, space between the plurality of walls 262 at any point along the length of any individual cell 260. The ceramic core structure 204 may also comprise a cross-sectional geometry 264 that is non-uniform from the side 210 to the side 212. The cross-sectional geometry 264 may be hexagonal, circular, square, triangular, etc.

While the ceramic core structure 204 is depicted as having a plurality of uniformly-sized hollow cells 260 that are parallel with one another, it should be appreciated that a variety of alternative or additional configurations may also be realized within the scope of this disclosure. For example, the plurality of hollow cells 260 may comprise different geometries and different orientations and differently-sized cells at different parts of the ceramic core structure 204 for different functional needs. Moreover, the cross-sectional geometry 264 may have an open cross-sectional area that is smaller, larger, or have a different shape at one or more locations along at least a portion of one of the plurality of hollow cells 260. For example, the cross-sectional geometry 264 from the side 210 to the side 212 may be uniform for one or more of the plurality of hollow cells 260. That is, the hollow cell 260 will have the same cross-sectional geometry 264 throughout its entire length.

Alternatively, or additionally, one or more of the plurality of hollow cells 260 may comprise a cross-sectional geometry 264 from the side 210 to the side 212 that is nonuniform. That is, the cross-sectional geometry 264 may have an open cross-sectional area that is smaller, larger, or have a geometry that is a different shape at one or more locations along at least one of the plurality of hollow cells 260 to provide an overall cross-sectional geometry 264 that is nonuniform between its side 210 and side 212. Having a cross-sectional geometry 264 that is nonuniform may facilitate enhanced bonding with CMC face sheet 208, such as by providing additional material or surface area on the side 210 or the side 212 of the ceramic core structure 204, while still reducing the amount of overall material used in the ceramic core structure 204 via the overall configuration of the plurality of hollow cells 260.

In exemplary embodiments, at least one of the plurality of hollow cells 260 of the ceramic core structure 204 has a midspan cross-sectional geometry 264 of approximately a ⅜" open cell 260 size between the side 210 and the side 212 with partially closed ends 268 and 270 of the cell 260 at the respective side 210 and the side 212. As used herein, midspan refers to any location between the side 210 and the side 212, whether it is halfway therebetween or skewed towards the side 210 or the side 212. In exemplary embodiments, the partially closed ends 268 and 270 are formed during additive manufacturing of the ceramic core structure 204. However, in other exemplary embodiments, the ceramic core structure 204 may be additively manufactured without the partially closed ends 268 and 270 (e.g., having a solid side 210 and side 212) such that the side 210 and the side 212 are thereafter perforated to form the partially closed ends 268 and 270.

Figure 9:
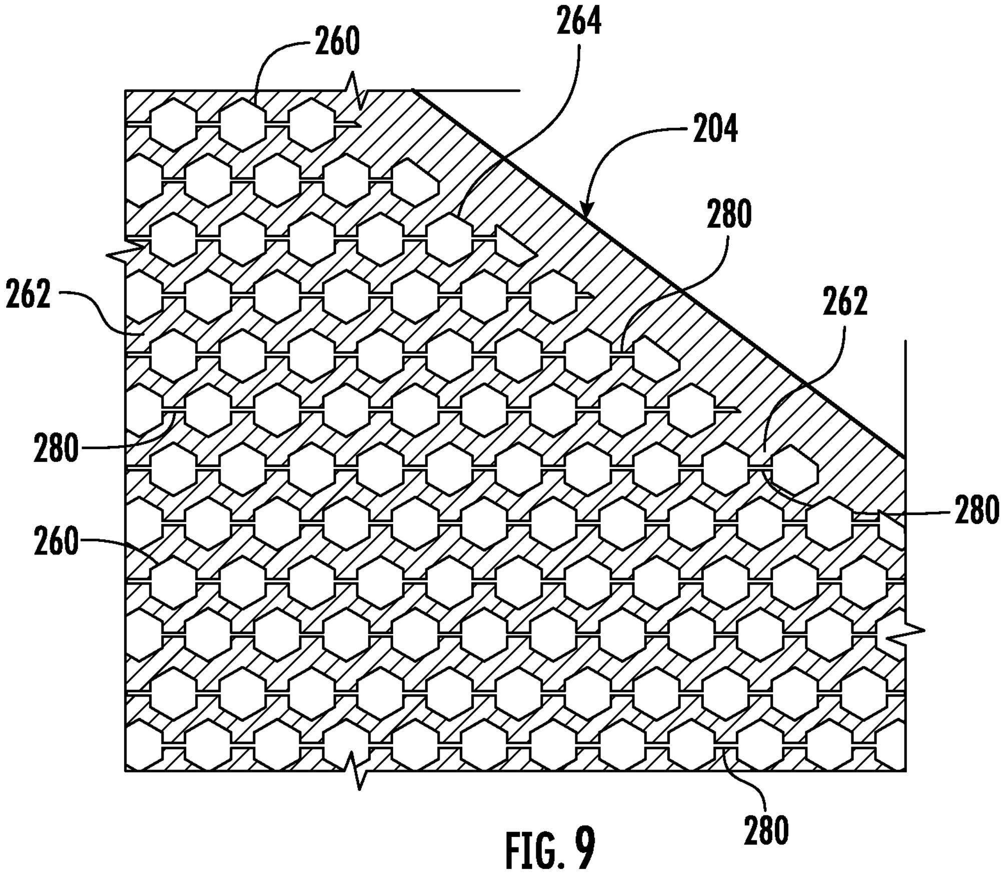
FIG. 9 is a schematic, partial cross-sectional view of the exemplary ceramic core structure of FIG. 7 taken along the line 9-9 of FIG. 7 in accordance with an embodiment of present disclosure.

FIG. 9 illustrates that the ceramic core structure 204 can be additively manufactured with one or more passageways or apertures 280 extending through one or more walls 262 to fluidly link adjacently disposed cells 260. In exemplary embodiments, the apertures 280 may be located in the wall(s) 262 at any midspan location between the side 210 (FIG. 8) and the side 212 (FIG. 8). In exemplary embodiments, the apertures 280 form a fluid flow path within the ceramic core structure 204 (e.g., for heating, cooling, etc.). In the illustrated embodiment, the apertures 280 are depicted as extending along a single direction or being unidirectional relative to the ceramic core structure 204. However, it should be understood that the apertures 280 may be formed at varying directions and having varying geometries. It should be further understood that one or more apertures 280 may be formed in any particular single wall 262.

In exemplary embodiments, the ceramic core structure 204 resulting from the additive manufacturing undergoes a densification process such that the ceramic core structure 204 is pyrolyzed and melt-infiltrated prior to further assembly operations. In exemplary embodiments, the ceramic core structure 204 comprises a SiC monolithic ceramic core structure 204 such that, after 3D printing, the ceramic core structure 204 is a combination of SiC and C. During melt infiltration of the ceramic core structure 204, Si is applied to the ceramic core structure 204 and, during melt infiltration, Si infiltrates the ceramic core structure 204. The Si reacts with the C in the ceramic core structure 204 during melt infiltration to form new, additional SiC and consolidates the ceramic core structure 204. In this manner, the ceramic core structure 204 can be considered a monolithic ceramic core structure.

Figure 10:
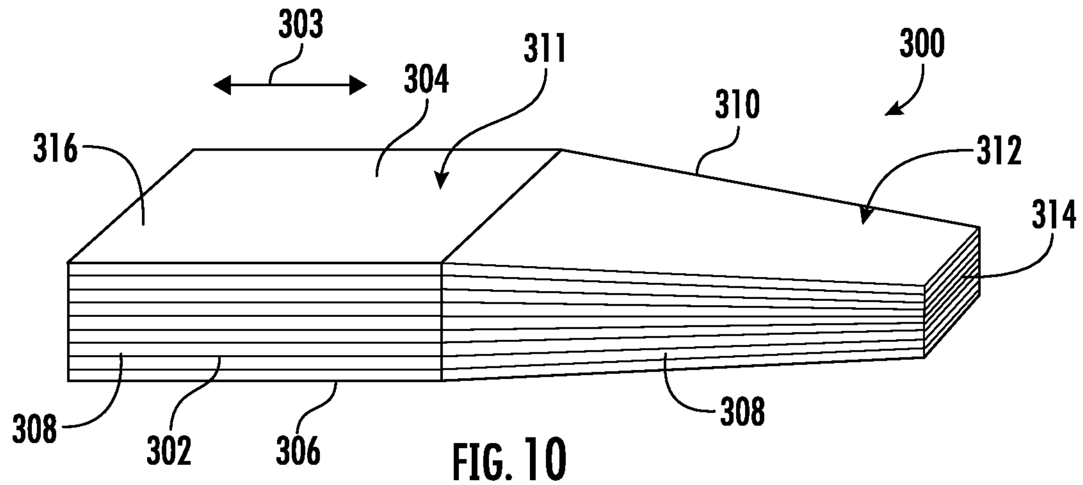
FIG. 10 is a schematic view of an exemplary CMC structure that may be used in the exemplary ceramic composite component of FIG. 4 in accordance with an embodiment of the present disclosure.

FIG. 10 is a schematic view of an exemplary embodiment of a CMC structure 300 in accordance with an embodiment of the present disclosure. The CMC structure 300 may be used as the CMC structure 206 (FIGS. 4 and 5) forming part of the ceramic composite component 200 (FIGS. 4 and 5). In the illustrated embodiment, the CMC structure 300 comprises a quantity of CMC plies 302. Additionally, in exemplary embodiments, the reinforcing fibers of the CMC plies 302 may be oriented in a longitudinal direction 303 of the CMC structure 300. However, it should be understood that the CMC plies 302 may be laid up such that the orientation of the reinforcing fibers of the CMC plies 302 may be otherwise configured such that the ply architecture for the CMC plies 302 is optimized based on the specific loading for a particular application.

For illustrative purposes and case of clarity, a side 304 of the CMC structure 300 may also be referred to as the top side 304 of the CMC structure 300. For illustrative purposes and ease of clarity, a side 306 of the CMC structure 300 opposite the side 304 may also be referred to as the bottom side 306 of the CMC structure 300. The side 304 and the side 306 of the CMC structure 300 may correspond respectively to the side 214 and the side 216 of the CMC structure 206 (FIGS. 4 and 5). In the illustrated embodiment, the CMC structure 300 also includes sidewalls 308 and 310. Sidewalls 308 and 310 may correspond respectively to the sidewalls 230 and 232 of the CMC structure 206 (FIGS. 4 and 5). In FIG. 10, for case of illustration and description, the CMC structure 300 is depicted without an interlocking feature (e.g., the interlocking feature 220 of the CMC structure 206 (FIGS. 4 and 5)); however, it should be understood that the CMC structure 300 may be configured with such an interlocking feature, for example, similar to the interlocking feature 220 of the CMC structure 206 (FIG. 5) to correspondingly engage with the interlocking feature 218 of the ceramic core structure 204 (FIG. 5). Integration between the CMC structure 300 shaft and complex aerodynamic control surfaces may include interlocking features such as dovetail, mortise & tenon, key hole or similar retention features to prevent separation of the CMC structure 300 from such other surface or component.

Figure 7:
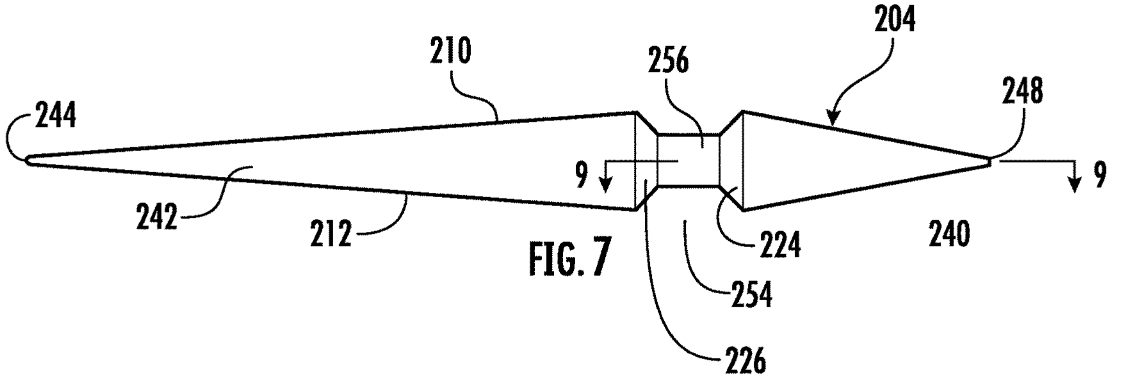
FIG. 7 is a schematic, side view of the exemplary ceramic core structure of FIG. 6 in accordance with an embodiment of the present disclosure.

In FIG. 10, the CMC structure 300 includes a non-tapered portion 311 and a tapered portion 312. The non-tapered portion 311 is formed or configured having a substantially constant thickness (e.g., across its length, width, and depth), and the tapered portion 312 is formed or configured such that at least a portion of the side 304, the side 306, and sidewalls 308 and 310 are tapered (e.g., tapered inwardly in the illustrated embodiment). However, it should be understood that the geometric configuration of the CMC structure 300 may vary. In FIG. 10, the CMC structure 300 is sized and geometrically configured to geometrically complement the recessed portion 254 of the ceramic core structure 204 (FIGS. 6 and 7) such that the side 304 and the side 306 of the CMC structure 300 align with or are flush with the respective adjacent side 210 and side 212 of the ceramic core structure 204 (FIGS. 5-7) when the CMC structure 300 is disposed within the recessed portion 254 of the ceramic core structure 204 (FIGS. 5-7). For example, in an assembled position, at least a portion of the tapered portion 312 is disposed within the recessed portion 254 of the ceramic core structure 204 (FIGS. 5-7) such that a sidewall 314 of the CMC structure 300 is disposed adjacent to and abuts the sidewall 256 of the ceramic core structure 204 (FIGS. 5-7). In the above-referenced position relative to the ceramic core structure 204 (FIGS. 5-7), at least a portion 316 of the non-tapered portion 311 extends beyond the sidewalls 240 and 242 of the ceramic core structure 204 (FIGS. 4-7) and located outside the recessed portion 254. In the illustrated embodiment, the CMC structure 300 has a rectangular-shaped cross section; however, it should be understood that the CMC structure 300 may be formed or configured having other geometrical shapes and cross-sectional areas for cost, performance, or other drivers. Further, it should be understood that a desired geometrical configuration of the CMC structure 300 may be formed based on the shape, configuration, or layup of the CMC plies 302, or the CMC structure 300 may be machined or cut to a desired shape after burn-out and melt infiltration of the CMC plies 302. The CMC structure 300 may have edges, corners, or both, that are straight, tapered, or rounded. By way of non-limiting example, the corners of the CMC structure 300 may be rounded to minimize contact stresses.

In exemplary embodiments, the CMC plies 302 undergo densification. Thus, in this embodiment, a silicon-based matrix material is applied to the CMC plies 302 forming the CMC structure 300 such that the CMC structure 300 is burned out and undergoes a melt infiltration process. As indicated above, after the melt infiltration process, the CMC structure 300 may be machined or cut to a desired shape or geometric configuration.

Figure 11:
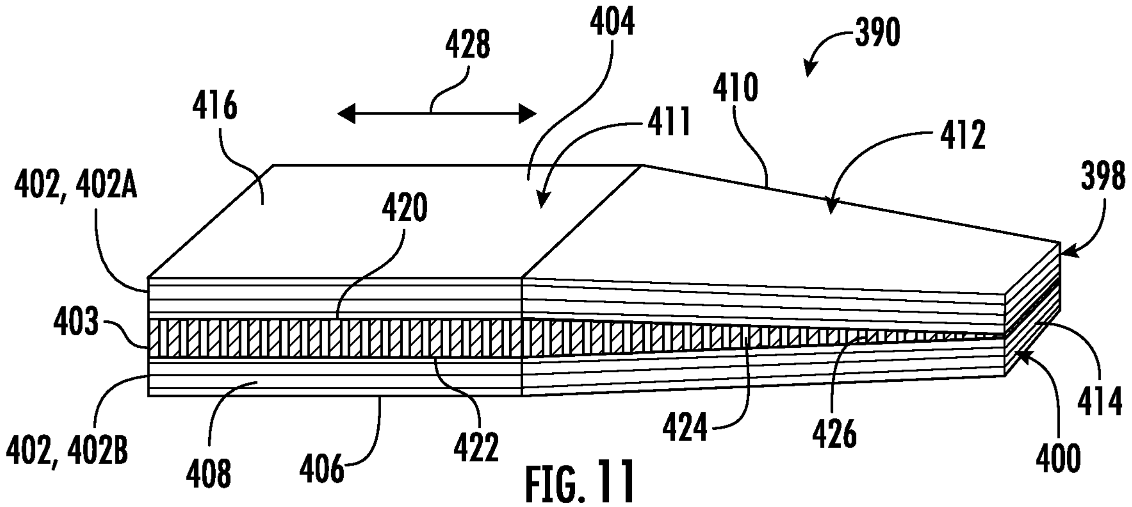
FIG. 11 is a schematic view of another exemplary CMC structure that may be used in the exemplary ceramic composite component of FIG. 4 in accordance with an embodiment of the present disclosure.

FIG. 11 is a schematic view of an exemplary embodiment of a CMC structure 390 in accordance with another embodiment of the present disclosure. The CMC structure 390 may be used as the CMC structure 206 (FIGS. 4 and 5) forming part of the ceramic composite component 200 (FIGS. 4 and 5). It should also be understood that in alternate embodiments of the ceramic composite component 200 (FIGS. 4 and 5), multiple CMC structures could be utilized in the ceramic composite component 200 (FIGS. 4 and 5). By way of non-limiting example, both the CMC structure 300 (FIG. 10) and the CMC structure 390, or aspects or portions thereof, could be utilized at the same time in the ceramic composite component 200 (FIGS. 4 and 5).

In the illustrated embodiment, the CMC structure 390 comprises a CMC face sheet 398, a CMC face sheet 400, and a ceramic core structure 403 disposed or sandwiched between the CMC face sheet 398 and the CMC face sheet 400. Each of the CMC face sheet 398 and the CMC face sheet 400 include a quantity of CMC plies 402 (e.g., one or more CMC plies 402*a* and one or more CMC plies 402*b* forming the respective face sheet 398 and the face sheet 400). For illustrative purposes and case of clarity, a side 404 of the CMC structure 390 may also be referred to as the top side 404 of the CMC structure 390. For illustrative purposes and ease of clarity, a side 406 of the CMC structure 390 opposite the sides 404 may also be referred to as the bottom side 406 of the CMC structure 390. The side 404 and the side 406 of the CMC structure 390 may correspond respectively to the side 214 and the side 216 of the CMC structure 206 (FIGS. 4 and 5). In the illustrated embodiment, the CMC structure 390 also includes sidewalls 408 and 410. Sidewalls 408 and 410 may correspond respectively to the sidewalls 230 and 232 of the CMC structure 206 (FIGS. 4 and 5). In FIG. 11, for case of illustration and description, the CMC structure 390 is depicted without an interlocking feature (e.g., the interlocking feature 220 of the CMC structure 206 (FIGS. 4 and 5)); however, it should be understood that the CMC structure 390 may be configured with such an interlocking feature, for example, similar to the interlocking feature 220 of the CMC structure 206 (FIG. 5) to correspondingly engage with the interlocking feature 218 of the ceramic core structure 204 (FIG. 5).

In FIG. 11, the CMC structure 390 includes a non-tapered portion 411 and a tapered portion 412. The non-tapered portion 411 is formed or configured having a substantially constant thickness (e.g., across its length, width, and depth), and the tapered portion 412 is formed or configured such that at least a portion of the side 404, the side 406, and sidewalls 408 and 410 are tapered (e.g., tapered inwardly in the illustrated embodiment). However, it should be understood that the geometric configuration of the CMC structure 390 may vary. In exemplary embodiments, the face sheet 398 and the face sheet 400 are formed having a constant (or substantially constant) thickness as measured in a direction extending from the side 404 to the side 406. In the illustrated embodiment, the ceramic core structure 403 is configured or formed such that its thickness as measured in a direction extending from the side 404 to the side 406 varies in thickness to produce the tapered portion 412. In exemplary embodiments, a thickness of the ceramic core structure 403 is configured having a thickness as measured in a direction extending from the side 404 to the side 406 as a percentage of the overall thickness of the CMC structure 390 measured in a corresponding direction. In exemplary embodiments, a thickness of the ceramic core structure 403 as measured in a direction extending from the side 404 to the side 406 is one-half (or approximately one-half) of the overall thickness of the CMC structure 390 measured in a corresponding direction.

In FIG. 11, the CMC structure 390 is sized and geometrically configured to geometrically complement the recessed portion 254 of the ceramic core structure 204 (FIGS. 6 and 7) such that the side 304 and the side 306 of the CMC structure 390 align with or are flush with the respective adjacent side 210 and side 212 of the ceramic core structure 204 (FIGS. 5-7) when the CMC structure 390 is disposed within the recessed portion 254 of the ceramic core structure 204 (FIGS. 5-7). For example, in an assembled position in the ceramic composite component 200 (FIG. 4), the tapered portion 412 is disposed within the recessed portion 254 of the ceramic core structure 204 (FIGS. 5-7) such that a sidewall 414 of the CMC structure 390 is disposed adjacent to and abuts the sidewall 256 of the ceramic core structure 204 (FIGS. 5-7). In the above-referenced position relative to the ceramic core structure 204 (FIGS. 5-7), at least a portion 416 of the non-tapered portion 411 extends beyond the sidewalls 240 and 242 of the ceramic core structure 204 (FIGS. 4-7) and is disposed outside the recessed portion 254. In the illustrated embodiment, at least a portion of the CMC structure 390 is rectangular-shaped; however, it should be understood that the CMC structure 390 may be formed or configured having other geometrical shapes and cross-sectional areas and may vary in cross-sectional geometry along its width, length, or depth. Further, it should be understood that a desired geometrical configuration of the CMC structure 390 may be formed based on the shape, configuration, or layup of the CMC plies 402 and the ceramic core structure 403, or the CMC structure 390 may be machined or cut to a desired shape after burn-out and melt infiltration of the CMC structure 390.

In exemplary embodiments, the ceramic core structure 403 may be formed similarly to the ceramic core structure 204 (FIG. 6). In exemplary embodiments, the ceramic core structure 403 may comprise a different material compared to the CMC plies 402. By way of non-limiting example, the ceramic core structure 403 may be such a material that is less dense than the material of the CMC plies 402. In exemplary embodiments, the ceramic core structure 403 may include a foam core or other porous ceramic material or a solid ceramic material. However, even when the material of the ceramic core structure 403 is different, it is compatible with the CMC plies 402 to produce a sufficient bond between the components, including in extreme operating conditions such as high temperatures. In exemplary embodiments, the ceramic core structure 403 may include silicon carbide (SiC) or silicon (Si).

In exemplary embodiments, the ceramic core structure 403 comprises an additively manufactured structured honeycomb core using monolithic SiC. The additive manufacturing processes referenced herein may be used for forming the ceramic core structure 403 with one or more ceramic-based layers using any suitable ceramic particle compounds. For instance, an additively-manufactured ceramic core structure may be produced via binder jet printing or other additive manufacturing techniques. However, the additively-manufactured ceramic core structure 403 may require de-powdering (e.g., removing loose powder from the hollow interior thereof. In exemplary embodiments, the ceramic core structure 403 resulting from the additive manufacturing process undergoes a densification process such that the ceramic core structure 403 is pyrolyzed and melt-infiltrated prior to the application of the CMC plies 402*a* and 402*b* to the ceramic core structure 403. In exemplary embodiments, the ceramic core structure 403 comprises a SiC monolithic ceramic core structure 403 such that, after 3D printing, the ceramic core structure 403 is a combination of SiC and C. During melt infiltration of the ceramic core structure 403, Si is applied to the ceramic core structure 403 and, during melt infiltration, Si infiltrates the ceramic core structure 403. The Si reacts with the C in the ceramic core structure 403 during melt infiltration to form new, additional SiC and consolidates the ceramic core structure 403 (e.g., forming a monolithic ceramic core structure).

In exemplary embodiments, the ceramic core structure 403 includes plurality of hollow cells 424 defined by a plurality of walls 426 extending from a side 420 of the ceramic core structure 403 to a side 422 of the ceramic core structure 403 opposite the side 420. In exemplary embodiments, the ceramic core structure 403 may function as a mandrel such that the CMC plies 402*a* and 402*b* are applied to the side 420 and the side 422 of the ceramic core structure 403 to form the respective face sheet 398 and the face sheet 400. In exemplary embodiments according to the present disclosure, the ceramic core structure 403 functions as a mandrel such that a quantity of the CMC plies 402*a* and 402*b* are laid up on the respective side 420 and the side 422 of the ceramic core structure 403 and processed as described herein (e.g., undergoing thermal and/or chemical processing) to form the face sheet 398 and the face sheet 400, respectively. In exemplary additional or alternative embodiments, the ceramic core structure 403 may comprise a solid SiC structure (e.g., an additively manufactured solid core using monolithic SiC). The ceramic core structure 403 configured as a solid SiC structure may undergo thermal and chemical processing as described above (e.g., is pyrolyzed and melt-infiltrated).

In exemplary embodiments, the face sheet 398 and the face sheet 400 extend across the respective side 420 and the side 422 of the ceramic core structure 403 such that the face sheet 398 and the face sheet 400 terminate coincident with the perimeter or boundaries of the ceramic core structure 403. Additionally, in exemplary embodiments, the reinforcing fibers of the CMC plies 402*a* and CMC plies 402*b* may be oriented in a longitudinal direction 428 of the CMC structure 390. However, it should be understood that the CMC plies 402*a* and CMC plies 402*b* may applied to the ceramic core structure 403 such that the orientation of the reinforcing fibers of the CMC plies 402*a* and CMC plies 402*b* may be otherwise configured.

In exemplary embodiments, after melt-infiltration of the ceramic core structure 403, the CMC plies 402*a* and 402*b* are applied to the ceramic core structure 403. The CMC plies 402*a* and 402*b* may undergo thermal processing, such as a cure or burn-out to yield a high char residue, and then subsequent chemical processing (e.g., melt infiltration with silicon) with the ceramic core structure 403. Thus, in this embodiment, a silicon-based matrix material is applied to the CMC plies 402*a* and 402*b* forming the respective face sheet 398 and the face sheet 400, and the ceramic core structure 403, such that the ceramic core structure 403 and the CMC 402*a* and 402*b* forming the respective face sheet 398 and the face sheet 400 are burned out and undergo a melt infiltration process together. As a result, the face sheet 398 and the face sheet 400 form a seamless, integrated unitary structure with the ceramic core structure 403. After densification, the CMC structure 390 may be machined or cut to a desired geometric configuration.

Figure 12:
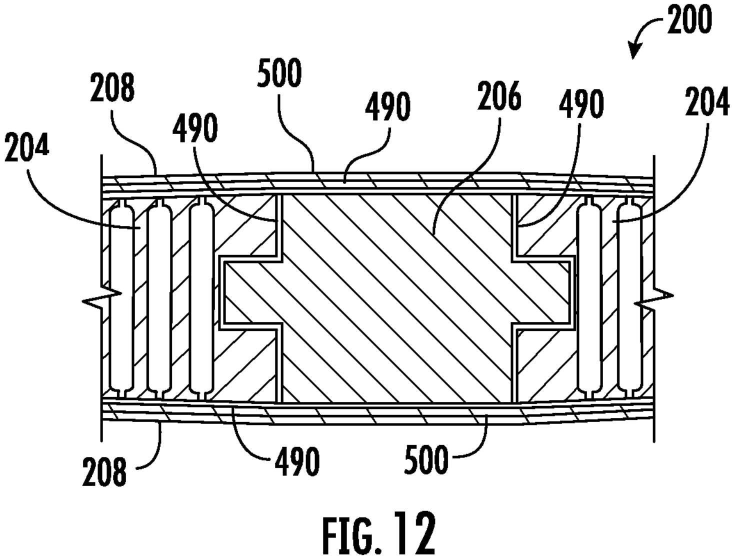
FIG. 12 is an enlarged cross-sectional view of a portion of the exemplary ceramic composite component of FIG. 5 in accordance with an embodiment of the present disclosure.

FIG. 12 is an enlarged view of a portion of the exemplary ceramic composite component of FIG. 5 in accordance with an embodiment of the present disclosure. The ceramic composite component 200 and a method for assembling the same are illustrated utilizing a pliable matrix material 490, which can be used, for example, for bonding the components illustrated in FIGS. 1-11. Generally, the pliable matrix material 490 is a supplemental material placed between the ceramic core structure 204 and the CMC structure 206, between the CMC face sheet 208 and the ceramic core structure 204 and the CMC structure 206, or any combination thereof, to bond the respective components together and accommodate for dimensional mismatches. That is, the pliable matrix material 490 is capable of conforming (i.e., taking the geometry and shape of the adjacent components) to the interface or interface surfaces (i.e., surfaces that will be bonded to each other) between the ceramic core structure 204 and the CMC structure 206, or between the CMC face sheet 208 and the ceramic core structure 204 and the CMC structure 206, or any combination thereof. Thus, for example, the pliable matrix material 490 facilitates the bonding of the CMC structure 206 to at least a portion of the walls 262 (FIGS. 6, 8, and 9) of the ceramic core structure 204. After application, the pliable matrix material 490 can be densified, such as through infiltration, to conform to and bond the adjacent components in the ceramic composite component 200. It should also be understood that the pliable matrix material 490 may also be placed between the ceramic core structure 403 (FIG. 11) and the face sheet 398/face sheet 400 (FIG. 11) of the CMC structure 390 (FIG. 11).

The pliable matrix material 490 may be a ceramic filler material comprising a liquid carrier (e.g., solvent), a powder constituent comprising reactive and non-reactive ceramic precursor materials, and a polymeric binder (e.g., resin) disposed in the liquid carrier. The liquid carrier of the pliable matrix material 490 may be selected such that it partially or fully dissolves one or more organic components of the formulation, such as the binder. In some embodiments, the liquid carrier can comprise water, one or more alcohols, or other organic liquids (e.g., acetone or toluene), or combinations thereof. The amount of liquid carrier can also be adjusted to change the physical consistency of the pliable matrix material 490, such as by increasing the amount of the liquid carrier so that the pliable matrix material 490 can be applied as a pliable matrix material paste, or decreasing the amount of liquid carrier so that the pliable matrix material 490 can be applied as a tape. For instance, in some embodiments, the liquid carrier may comprise 50% to 70% by volume of the pliable matrix material 490, or from 55% to 65% by volume of the pliable matrix material 490. Such embodiments can produce a pliable matrix material 490 that is fluid but with a low viscosity. In some embodiments, the liquid carrier may comprise 5% to 15% by volume of the pliable matrix material 490, or from 7% to 13% by volume of the pliable matrix material 490. Such embodiments can produce a pliable matrix material 490 in the form of a tape or film.

The powder of the pliable matrix material 490 may comprise at least one of silicon, silicon carbide, or carbon or other ceramic precursor materials directed at an end-point ceramic material composition such as SiC or other carbides, oxycarbides and other relevant materials. In some embodiments, the powder comprises 10% to 90% carbon by weight. In some embodiments, the powder comprises 20% to 80% carbon by weight. In some embodiments, the powder comprises 30% to 70% carbon by weight. In some embodiments, the powder comprises 40% to 60% carbon by weight. In some embodiments, the powder may additionally, or alternatively, include other forms of material such as fiber material. For instance, the pliable matrix material 490 can include a scrim material comprising randomly oriented carbon fibers such as to form a tape. In some embodiments, the pliable matrix material 490 may comprise chopped fibers.

In some embodiments, the powder of the pliable matrix material 490 comprises carbon and silicon carbide. Carbon or other reactive materials can enable a reaction with silicon during melt infiltration to form silicon carbide. For example, in some embodiments, the powder comprises 40 percent to 60 percent carbon by weight and 40 percent to 60 percent silicon carbide by weight. In some embodiments, the powder comprises 45 percent to 55 percent carbon by weight and 45 percent to 55 percent silicon carbide by weight.

The polymeric binder of the pliable matrix material 490 may be used to alter the flow properties of the pliable matrix material 490, such as by thickening the pliable matrix material 490 to allow it to remain in place (e.g., as a paste) when applied to the ceramic core structure 204 and the CMC structure 206 as described herein.

Optionally, the pliable matrix material 490 further comprises other ingredients disposed in the liquid carrier, such as a shrinkage control agent, which provides a measure of rigidity to the formulation as it is processed. For example, the mass loss associated with volatilizing the liquid carrier and converting the binder to char creates a driving force to shrink the size of the remaining material, and excessive shrinkage can lead to undesirable cracking within the product material. Including a shrinkage control agent such as short fibers can provide mechanical support to mitigate the tendency to shrink. Alternatively, or additionally, the pliable matrix material 490 can comprise a plasticizer, a dispersant, other supplemental material(s), or combinations thereof.

The pliable matrix material 490 (e.g., the liquid carrier, the powder, or the polymeric binder) may be selected to have substantially similar thermodynamic, physical, or chemical properties to the rest of the components of the ceramic composite component 200 (e.g., such that the thermodynamic, physical, or chemical properties of the pliable matrix material 490 are well-matched to the thermodynamic, physical, or chemical properties of the of the ceramic core structure 204, the CMC structure 206, and the CMC face sheet 208.

For instance, the pliable matrix material 490, the CMC face sheet 208, the ceramic core structure 204, and the CMC structure 206 may have a substantially similar coefficient of thermal expansion, elastic modulus, thermal conductivity, oxidation resistance, material compatibility, or chemical composition. As one example, the pliable matrix material 490 may have a material compatibility that helps prevent an unfavorable or undesirable reaction between the pliable matrix material 490 and the CMC face sheet 208, the ceramic core structure 204, and the CMC structure 206. Because the thermodynamic, physical, or chemical properties are substantially similar or well-matched, the joints between the ceramic core structure 204 and the CMC structure 206, or the joint between the CMC face sheet 208 and the ceramic core structure 204/CMC structure 206, need not be defined as precisely as otherwise required since the pliable matrix material 490 can thereby accommodate dimensional mismatches by filling in the gaps.

As depicted in FIG. 12, the pliable matrix material 490 is disposed between the ceramic core structure 204 and the CMC structure 206. The pliable matrix material 490 is also disposed at other interface surfaces of the CMC face sheet 208, the ceramic core structure 204, and the CMC structure 206. However, it should be understood that in exemplary embodiments, the pliable matrix material 490 may be omitted from certain locations. In exemplary embodiments, the pliable matrix material 490 may be omitted from being between the CMC face sheet 208 and the ceramic core structure 204 and the CMC structure 206 as the CMC face sheet 208 may sufficiently accommodate dimensional mismatches between the ceramic core structure 204 and the CMC structure 206. The pliable matrix material 490 can be applied in a variety of configurations, such as, for example, laying down a pliable matrix material paste or tape comprising the pliable matrix material, or spraying the pliable matrix material.

In exemplary embodiments, the pliable matrix material 490 may be applied as a conformal matrix ply. The conformal matrix ply may comprise a relatively flat and solid structure that can sit between or at interfaces of the CMC face sheet 208, the ceramic core structure 204, and the CMC structure 206. Alternatively, or additionally, in exemplary embodiments, the pliable matrix material 490 may be applied as a pliable matrix material paste. The paste can be placed on or around the joints between the CMC face sheet 208, the ceramic core structure 204, and the CMC structure 206, between the ceramic core structure 204 and the CMC structure 206, or at other interface surfaces of the components. Any suitable application technique can be used for the paste, such as, but not limited to, brushing, injecting, molding, or the like. In some embodiments where the pliable matrix material 490 comprises a pliable matrix material paste, the pliable matrix material 490 may form a fillet between the CMC face sheet 208, the ceramic core structure 204, and the CMC structure 206. Such fillets may help reduce stress concentrations at the joints due to the rounded shape and material bonding.

In exemplary embodiments, the CMC face sheet 208 comprises a quantity of CMC plies 500. Similar to as described above in connection with the CMC plies 302 (FIG. 10) or CMC plies 402 (FIG. 11).

In exemplary embodiments, the CMC plies 500 are applied over or substantially covering the entirety of the ceramic core structure 204 and the CMC structure 206 such that the CMC face sheet 208 substantially surrounds the ceramic core structure 204 and the CMC structure 206. As used herein, the terms "substantially surround" and "substantially surrounding" means that the ceramic core structure 204 and the CMC structure 206 have at least 90% of their surface areas covered by the CMC face sheet 208, such as 95% of its surface area covered by the CMC face sheet 208. The terms "substantially surround" and "substantially surrounding" may include completely surrounds and completely surrounding, respectively. The reinforcing fibers of the CMC plies 500 may be oriented in any desired direction based on the strength requirements and load conditions anticipated to be experienced by the ceramic composite component 200.

The ceramic composite component 200 further undergoes a densifying process to densify the pliable matrix material 490 and the CMC plies 500 to bond the pliable matrix material 490 and the CMC plies 500 to respective interfaces with the ceramic core structure 204 and the CMC structure 206. That is, the pliable matrix material 490 will form a conformal interface layer of matrix material that is densified that conformed to and bonded with the ceramic core structure 204, the CMC structure 206, and the CMC face sheet 208.

Densification can comprise undergoing burnout (or firing) and densifying the remaining material. For example, the pliable matrix material 490 and the CMC plies 500 may be heated (fired) in a vacuum or inert atmosphere to decompose any binders and remove any solvents in the pliable matrix material 490 and the CMC plies 500 and convert the pliable matrix material 490 and the CMC plies 500 to the desired ceramic matrix material. Due to decomposition of the binders during burnout, the pliable matrix material 490 and the CMC plies 500 may be porous.

In some embodiments, densification can comprise densifying the pliable matrix material 490 and the CMC plies 500 with a densifying material via one or more infiltration processes. Infiltration can include may comprise melt infiltration (MI), chemical vapor infiltration (CVI), or polymer infiltration and pyrolysis (PIP), to fill the porosity and yield a densified ceramic composite component 200. Specific densifying material, processing techniques, and parameters for the above process will depend on the particular composition of the materials.

For example, silicon carbide CMC components may be infiltrated with molten silicon, e.g., through a silicon MI process or a reactive MI process. In some embodiments, densification through melt infiltration of one or more components (e.g., ceramic core structure 204 (FIGS. 5-9) the CMC structures 206, 300, or 390 (FIGS. 5, 10, and 11) or the CMC face sheet 208) may occur prior to lamination. The molten silicon can fill in the porosity while also reaching with present carbon to form silicon carbide. Other densification techniques include, but are not limited to, PIP processes (e.g., where silicon carbide reinforcement material components are infiltrated with a preceramic polymer, such as polysilazane and then heat treated to form a SiC matrix), oxide/oxide processes (e.g., for aluminum or alumino-silicate reinforcement material components), and CVI processes (e.g., for carbon fiber reinforced silicon carbide matrix (C/SiC) CMCs, for SiC/SiC CMCs, etc.). Thus, in some embodiments, the densifying material may comprise silicon or silicon carbide. In some embodiments, the densifying material may include germanium. In some embodiments, the densifying material may include silicon, germanium, boron, silicon germanium, or combinations thereof. Using melt infiltration may reduce free silicon in the matrices, provide stronger properties to the composite panel, or define different structures in the resulting matrices. Additionally, densifying a material, e.g., to produce a silicon-bonded SiC matrix, may reduce porosity within the subsequent matrix, thereby creating a denser, stronger, and more durable bond that is capable of withstanding extreme operating conditions, including high temperatures. As a result of densification, the ceramic composite component 200 will include matrix material 490 that is densified and bonded to the ceramic core structure 204 (FIGS. 5-9), the CMC structures 206, 300, or 390 (FIGS. 5, 10, and 11) and CMC face sheet 208.

Figure 13:
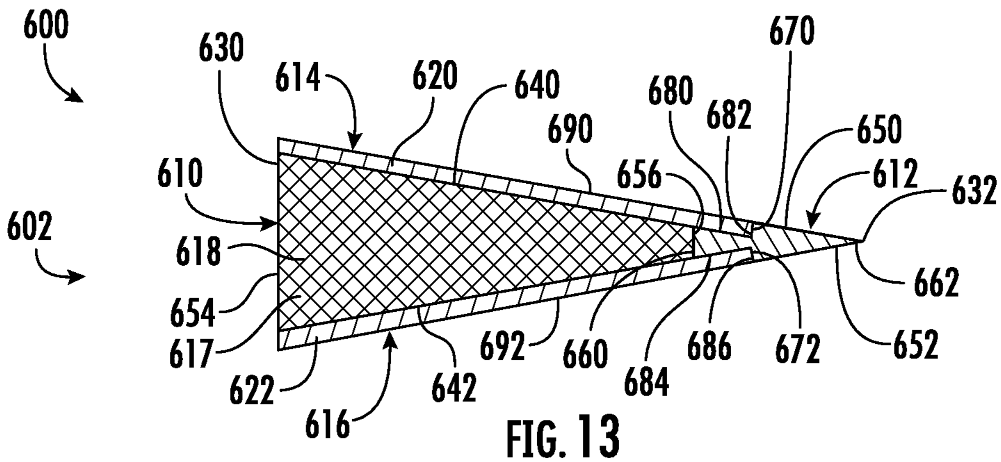
FIG. 13 is a schematic cross-sectional view of another exemplary ceramic composite component in accordance with an embodiment of the present disclosure.

FIG. 13 is a schematic view of another exemplary ceramic composite component 600 in accordance with an embodiment of the present disclosure. In the illustrated embodiment, the ceramic composite component 600 comprises a portion of an airfoil 602. However, it should be understood that the ceramic composite component 600 may be used in other applications.

In exemplary embodiments, the ceramic composite component 600 comprises a ceramic core structure 610, a ceramic core structure 612, and CMC face sheets 614 and 616. In exemplary embodiments, the ceramic core structure 610 comprises an additively manufactured ceramic core structure 610. In exemplary embodiments, the ceramic core structure 610 is a structured honeycomb core having one or more cavities or cells 617 defined by one or more walls 618. In exemplary embodiments, the ceramic core structure 610 is a monolithic ceramic core structure 610. In exemplary embodiments, the ceramic core structure 610 is manufactured using Si or SiC. In exemplary embodiments, the ceramic core structure 610 may be formed similarly to the ceramic core structure 204 (FIGS. 4-9) (e.g., also including or excluding apertures 280 (FIG. 9)). In exemplary embodiments, the ceramic core structure 612 comprises an additively manufactured ceramic core structure 612. In exemplary embodiments, the ceramic core structure 612 is a solid core structure. In exemplary embodiments, the ceramic core structure 612 is a monolithic ceramic core structure 612. In exemplary embodiments, the ceramic core structure 612 is manufactured using Si or SiC. In exemplary embodiments, the ceramic core structure 612 may be formed similarly to the ceramic core structure 204 (FIGS. 4-9) except as a solid, non-honeycombed structure. In exemplary embodiments, the CMC face sheets 614 and 616 each comprise a quantity of respective CMC plies 620 and 622. The CMC face sheets 614 and 616 may be formed similarly to the CMC face sheet 208 (FIGS. 4, 5 and 12), the CMC structure 300 (FIG. 10), or similarly to the CMC face sheet 398 and the CMC face sheet 400 of the CMC structure 390 (FIG. 11).

In the illustrated embodiment, the ceramic composite component 600 includes a first end 630 and a second end 632. As illustrated in FIG. 13, the ceramic composite component 600 comprises a tapered configuration such that the ceramic composite component 600 tapers inwardly from the first end 630 toward the second end 632. However, it should be understood that the ceramic composite component 600 may comprise other geometric configurations. In the illustrated embodiment, the ceramic core structure 610 includes a surface 640 and a surface 642, and the ceramic core structure 612 includes a surface 650 and a surface 652. The surface 642 is opposite the surface 640, and the surface 652 is opposite the surface 650. In the illustrated embodiment, the ceramic core structure 610 comprises a first end 654 corresponding to the first end 630 of the ceramic composite component 600 and a second end 656 located distally from the first end 654. The ceramic core structure 612 comprises a first end 660 and a second end 662 located distally from the first end 660 and corresponding to the second end 632 of the ceramic composite component 600. As illustrated in FIG. 13, the surface 640 and the surface 642 taper inwardly toward each other from the first end 654 to the second end 656, and the surface 650 and the surface 652 taper inwardly toward each other in a direction extending from the first end 660 toward the second end 662.

In the illustrated embodiment, the ceramic core structure 612 comprises a recess 670 extending inwardly from the first surface 650 (i.e., toward the second surface 652), and a recess 672 extending inwardly from the second surface 652 (i.e., toward the first surface 650). The recess 670 is defined by a recess surface 680 extending from the first end 660 toward the second end 662 and terminating at a recess wall 682 that extends from the recess surface 680 to the first surface 650. The recess 672 is defined by a recess surface 684 extending from the first end 660 toward the second end 662 and terminating at a recess wall 686 that extends from the recess surface 684 to the second surface 652. In exemplary embodiments, the recess 670 and the recess 672 are formed during additive manufacturing of the ceramic core structure 612. However, it should be understood that the recess 670 and the recess 672 may be formed by machining or other methods upon completion of the additive manufacturing process. In exemplary embodiments, the recess 670 and the recess 672 are formed such that the respective recess surface 680 and the recess surface 684 are aligned or flush with the adjacent respective surface 640 and the surface 642 of the ceramic core structure 610 when the ceramic core structure 612 is located against or abutting the ceramic core structure 610 as depicted in FIG. 13 (e.g., with the first end 660 of the ceramic core structure 612 located adjacent to or abutting the second end 656 of the ceramic core structure 610.

In the illustrated embodiment, the CMC plies 620 forming the CMC face sheet 614 are applied and bonded to the surface 640 of the ceramic core structure 610, the recess surface 680, and the recess wall 682 such that the CMC plies 620 extend from the first end 654 of the ceramic core structure 610 on the surface 640 thereof to at least a portion of the recess 670 on the recess surface 680 and terminate within the recess 670 adjacent to or abutting the recess wall 682. Similarly, the CMC plies 622 forming the CMC face sheet 616 are applied and bonded to the surface 642 of the ceramic core structure 610, the recess surface 684, and the recess wall 686 such that the CMC plies 622 extend from the first end 654 of the ceramic core structure 610 on the surface 642 thereof to at least a portion of the recess 672 on the recess surface 684 and terminate within the recess 672 adjacent to or abutting the recess wall 686. Thus, the CMC face sheet 614 is assembled such that a surface 690 of the CMC face sheet 614 is disposed flush, or substantially flush (or otherwise forming an aerodynamic surface), with the adjacent surface 650 of the ceramic core structure 612. Similarly, the CMC face sheet 616 is assembled such that a surface 692 of the CMC face sheet 616 is disposed flush, or substantially flush (or otherwise forming an aerodynamic surface), with the adjacent surface 652 of the ceramic core structure 612. In other words, the recesses 670 and 672 form respective pockets for receiving at least a portion of the respective CMC face sheets 614 and 616 therein. In exemplary embodiments, a solid core structure (i.e., the ceramic core structure 612) at edges of the ceramic composite component 600 provides better integrity during lay-up of the CMC face sheets 614 and 616. Additionally, the solid core structure (i.e., the ceramic core structure 612) results in less final machining at an edge of the ceramic composite component 600 and provides better erosion resistance at such edge.

In exemplary embodiments, the CMC plies 620 and 622 may be applied or laid up symmetrically (e.g., 0°, 90°, 90°, 0° fiber orientation relative to each other or to a particular reference frame) to minimize or eliminate warpage or to provide structural integrity in a particular direction. However, it should be understood that the CMC plies 620 and 622 may have other layup orientations.

Assembly of the ceramic composite component 600 is performed by bonding the ceramic core structure 610 to the ceramic core structure 612 and applying the CMC plies 620 and 622 onto the ceramic core structure 610 and the ceramic core structure 612 as described above. For case of description and illustration, the pliable matrix material 490 (FIG. 12) is not depicted in FIG. 13. However, it should be understood that the pliable matrix material 490 (FIG. 12) may be used to bond the ceramic core structure 610, the ceramic core structure 612, and the CMC face sheets 614 and 616 to each other. In exemplary embodiments, the pliable matrix material 490 (FIG. 12) may be applied to one or more interfaces where the ceramic core structure 610, the ceramic core structure 612, and the CMC face sheets 614 and 616 are adjacent to or abut each other. Thus, in exemplary embodiments, the pliable matrix material 490 (FIG. 12) may be applied between the first end 660 of the ceramic core structure 612 and the second end 656 of the ceramic core structure 610, on the surface 640 and the surface 642 between the ceramic core structure 610 and the respective CMC plies 620 and 622, and on the recess surface 680 and the recess surface 684 between the ceramic core structure 612 and the respective CMC plies 620 and 622. The assembled CMC face sheets 614 and 616, ceramic core structure 610, and the ceramic core structure 612, may then undergo thermal processing, such as a cure or burn-out and subsequent chemical processing, such as melt-infiltration with silicon, to arrive at the ceramic composite component 600.

Figure 14:
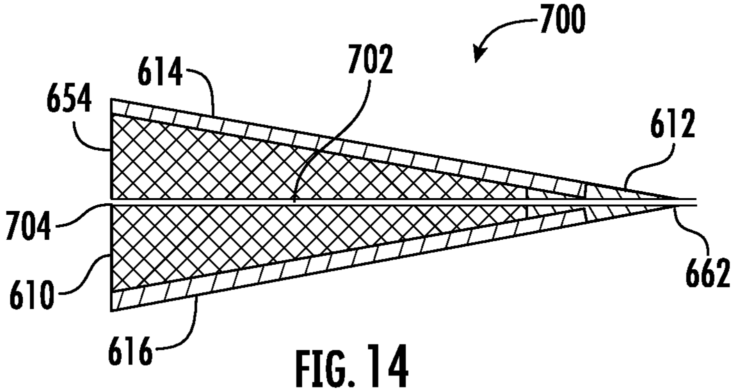
FIG. 14 is a schematic cross-sectional view of another exemplary ceramic composite component in accordance with an embodiment of the present disclosure.

FIG. 14 is a schematic view of another exemplary ceramic composite component 700 in accordance with an embodiment of the present disclosure. In exemplary embodiments, the ceramic composite component 700 may be formed similarly to the ceramic composite component 600 (FIG. 13) comprising the ceramic core structure 610, the ceramic core structure 612, and the CMC face sheets 614 and 616. In FIG. 14, the ceramic composite component 700 comprises a cooling passage 702 extending from the first end 654 of the ceramic core structure 610 to the second end 662 of the ceramic core structure 612. In exemplary embodiments, the cooling passage 702 comprises an opening or aperture extending through substantially a midplane location 704 of the ceramic composite component 700 being equidistant from the CMC face sheet 614 and the CMC face sheet 616 as the cooling passage 702 extends from the first end 654 toward the second end 662. As described above in connection with the ceramic core structure 204 (FIGS. 4-9), the ceramic core structure 610 may include cooling features in the ceramic core structure 610 (e.g., apertures 280) that exit through an edge of the ceramic composite component 700 (e.g., defined by the ceramic core structure 612) via the cooling passage 702.

Figure 15:
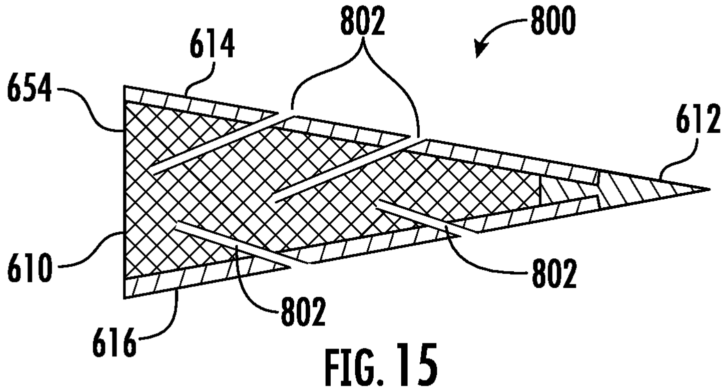
FIG. 15 is a schematic cross-sectional view of another exemplary ceramic composite component in accordance with an embodiment of the present disclosure.

FIG. 15 is a schematic view of another exemplary ceramic composite component 800 in accordance with an embodiment of the present disclosure. In exemplary embodiments, the ceramic composite component 800 may be formed similarly to the ceramic composite component 600 (FIG. 13) comprising the ceramic core structure 610, the ceramic core structure 612, and the CMC face sheets 614 and 616. In FIG. 15, the ceramic composite component 800 comprises one or more cooling passages 802 extending inwardly through respective CMC face sheets 614 and 616 and into the ceramic core structure 610. In exemplary embodiments, the cooling passages 802 comprise an opening or aperture extend through respective CMC face sheets 614 and 616 in a direction toward the first end 654 of the ceramic core structure 610. In exemplary embodiments, the cooling passages 802 are disposed at an orientation or direction forming an acute angle between a centerline of the respective cooling passage 802 and the respective CMC face sheet 614 or 616 facing the first end 654 of the ceramic core structure 610. However, it should be understood that the angular orientations of the cooling passages 802 relative to the CMC face sheets 614 and 616 may be otherwise configured. As described above in connection with the ceramic core structure 204 (FIGS. 4-9), the ceramic core structure 610 may include cooling features in the ceramic core structure 610 (e.g., apertures 280) that exit through exterior surfaces of the ceramic composite component 800 via the cooling passages 802.

Figure 16:
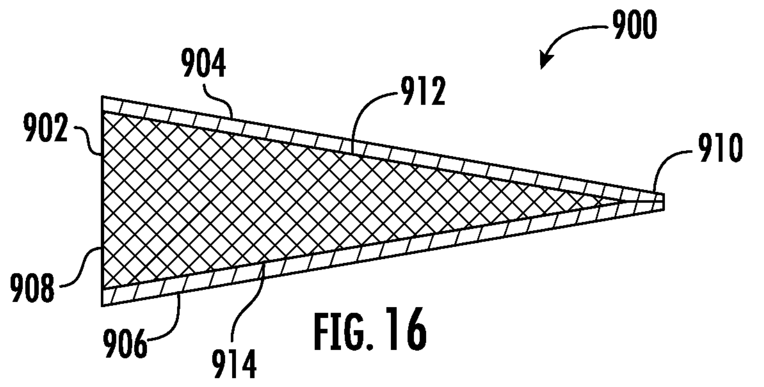
FIG. 16 is a schematic cross-sectional view of another exemplary ceramic composite component in accordance with an embodiment of the present disclosure.

FIG. 16 is a schematic view of another exemplary ceramic composite component 900 in accordance with an embodiment of the present disclosure. In exemplary embodiments, the ceramic composite component 900 may be formed similarly to the ceramic composite component 600 (FIG. 13) comprising a ceramic core structure 902 with a CMC face sheet 904 and a CMC face sheet 906 bonded to the ceramic core structure 902. The ceramic core structure 902 and the CMC face sheets 904 and 906 may be formed similarly as the respective ceramic core structure 610 (FIGS. 13-15) and the CMC face sheets 614 and 616 (FIGS. 13-15). Similar to the ceramic composite component 600 (FIG. 13), the ceramic composite component 900 has a tapered configuration such that the ceramic core structure 902 and the CMC face sheets 904 and 906 taper inwardly from a first end 908 of the ceramic composite component 900 toward a second end 910 of the ceramic composite component 900. In the illustrated embodiment, the CMC plies forming the CMC face sheet 904 extend over a surface 912 of the ceramic core structure 902 from the first end 908 to the second end 910, and the CMC plies forming the CMC face sheet 906 extend over a surface 914 of the ceramic core structure 902 from the first end 908 to the second end 910. In the illustrated embodiment, the CMC face sheets 904 and 906 merge and are bonded to each other at the second end 910. In exemplary embodiments, the CMC face sheets 904 and 906 are pinched together or are otherwise in contact with each other at the second end 910.

Figure 17:
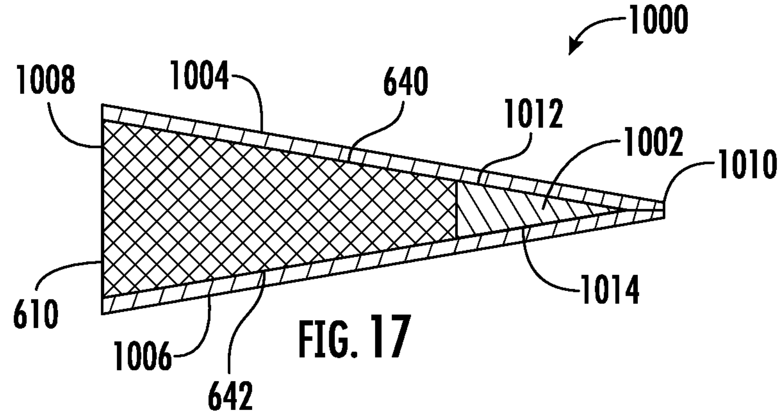
FIG. 17 is a schematic cross-sectional view of another exemplary ceramic composite component in accordance with an embodiment of the present disclosure.

FIG. 17 is a schematic view of another exemplary ceramic composite component 1000 in accordance with an embodiment of the present disclosure. In exemplary embodiments, the ceramic composite component 1000 may be formed similarly to the ceramic composite component 600 (FIG. 13) comprising the ceramic core structure 610 but includes a ceramic core structure 1002 instead of the ceramic core structure 612 (FIG. 13). The ceramic core structure 1002 may be formed similarly to the ceramic core structure 612 (FIG. 13) except without the recess 670 (FIG. 13) and the recess 672 (FIG. 13). The ceramic core structure 1002 is bonded to the ceramic core structure 610 similarly to the manner the ceramic core structure 612 (FIG. 13) is bonded to the ceramic core structure 610 for the ceramic composite component 600 (FIG. 13).

In the illustrated embodiment, the ceramic composite component 1000 also comprises CMC face sheets 1004 and 1006. The CMC face sheets 1004 and 1006 may be formed similarly to the CMC face sheets 614 and 616 (FIG. 13). Similar to the ceramic composite component 600 (FIG. 13), the ceramic composite component 1000 has a tapered configuration such that the ceramic core structure 610, the ceramic core structure 1002, and the CMC face sheets 1004 and 1006 taper inwardly from a first end 1008 of the ceramic composite component 1000 toward a second end 1010 of the ceramic composite component 1000. Similar to the ceramic composite component 900 (FIG. 16), the CMC face sheets 1004 and 1006 merge and are bonded to each other at the second end 1010. In exemplary embodiments, the CMC face sheets 1004 and 1006 are pinched together or are otherwise in contact with each other at the second end 1010.

In exemplary embodiments, the CMC plies forming the CMC face sheet 1004 extend over the surface 640 of the ceramic core structure 610 and over a surface 1012 of the ceramic core structure 1002 such that the CMC face sheet 1004 extends from the first end 1008 to the second end 1010 of the ceramic composite component 1000. Similarly, the CMC plies forming the CMC face sheet 1006 extend over the surface 642 of the ceramic core structure 610 and over a surface 1014 of the ceramic core structure 1002 such that the CMC face sheet 1006 extends from the first end 1008 to the second end 1010 of the ceramic composite component 1000. In the illustrated embodiment, similar to the ceramic composite component 902 (FIG. 16), the CMC face sheets 1004 and 1006 are pinched together or are otherwise in contact with each other at the second end 1010.

Figure 18:
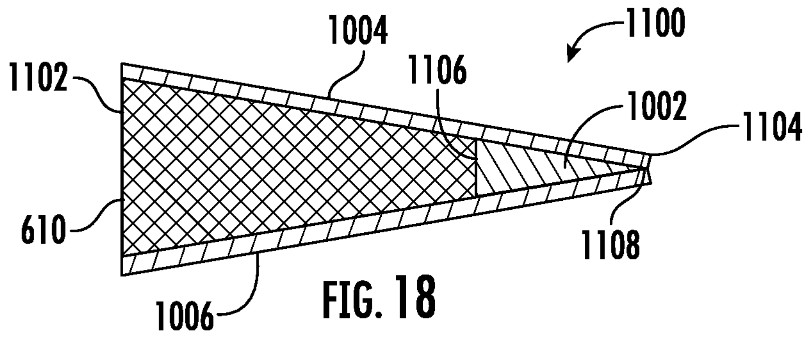
FIG. 18 is a schematic cross-sectional view of another exemplary ceramic composite component in accordance with an embodiment of the present disclosure.

FIG. 18 is a schematic view of another exemplary ceramic composite component 1100 in accordance with an embodiment of the present disclosure. In exemplary embodiments, the ceramic composite component 1100 may be formed similarly to the ceramic composite component 1000 (FIG. 17) comprising the ceramic core structure 610, the ceramic core structure 1002, and the CMC face sheets 1004 and 1006. In the illustrated embodiment, the ceramic composite component 1100 includes a tapered configuration (similar to the ceramic composite component 1000 (FIG. 17)) such that the ceramic core structure 610, the ceramic core structure 1002, and the CMC face sheets 1004 and 1006 taper inwardly from a first end 1102 of the ceramic composite component 1100 to a second end 1104 of the ceramic composite component 1100. In the illustrated embodiment, the ceramic core structure 1002 includes a first end 1106 bonded to the ceramic core structure 610 and a second end 1108 correspondingly located coincident with the second end 1104 of the ceramic composite component 1100. In the illustrated embodiment, the CMC face sheets 1004 and 1006 end or terminate at the second end 1104 of the ceramic composite component 1100 at a location corresponding to the second end 1108 of the ceramic core structure 1002.

Figure 19:
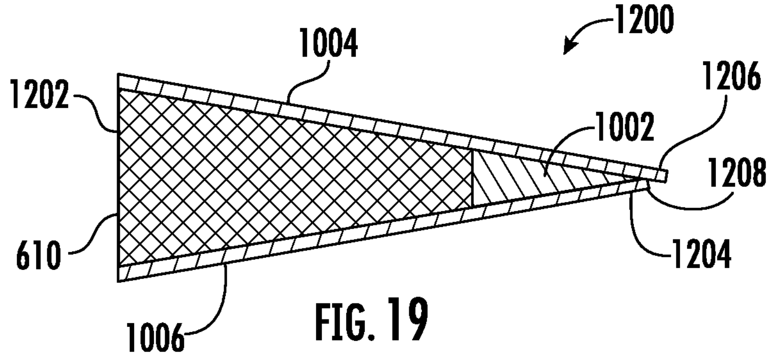
FIG. 19 is a schematic cross-sectional view of another exemplary ceramic composite component in accordance with an embodiment of the present disclosure.

FIG. 19 is a schematic view of another exemplary ceramic composite component 1200 in accordance with an embodiment of the present disclosure. In exemplary embodiments, the ceramic composite component 1200 may be formed similarly to the ceramic composite component 1100 (FIG. 18) comprising the ceramic core structure 610, the ceramic core structure 1002, and the CMC face sheets 1004 and 1006. In the illustrated embodiment, the ceramic composite component 1200 includes a tapered configuration (similar to the ceramic composite component 1100 (FIG. 18)) such that the ceramic core structure 610, the ceramic core structure 1002, and the CMC face sheets 1004 and 1006 taper inwardly from a first end 1202 of the ceramic composite component 1200 to a second end 1204 of the ceramic composite component 1100. In the illustrated embodiment, the CMC face sheets 1004 and 1006 end or terminate at the second end 1204 of the ceramic composite component 1200 such that at least a portion of one of the CMC face sheets 1004 or 1006 laps or overlaps at least a portion of the other CMC face sheet 1004 or 1006. For example, in the illustrated embodiment, a portion 1206 of the CMC face sheet 1004 laps or overlaps a portion 1208 of the CMC face sheet 1006 at the second end 1204 of the ceramic composite component 1100.

Figure 20:
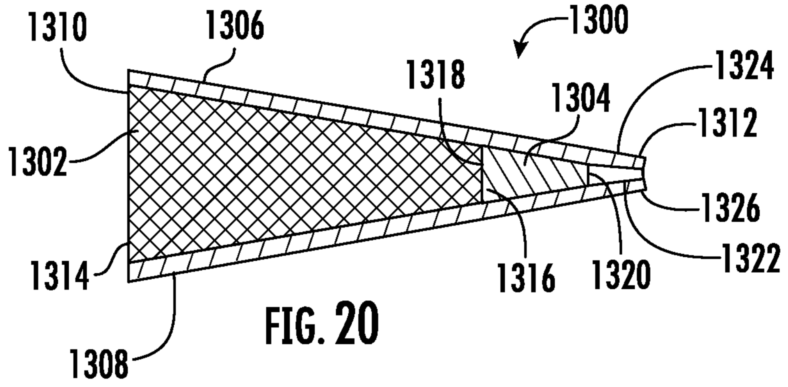
FIG. 20 is a schematic cross-sectional view of another exemplary ceramic composite component in accordance with an embodiment of the present disclosure.

FIG. 20 is a schematic view of another exemplary ceramic composite component 1300 in accordance with an embodiment of the present disclosure. In exemplary embodiments, the ceramic composite component 1300 may be formed similarly to the ceramic composite component 1000 (FIG. 17). For example, the ceramic composite component 1300 comprises a ceramic core structure 1302, a ceramic core structure 1304, and CMC face sheets 1306 and 1308. The ceramic core structure 1302 may be formed similarly to the ceramic core structure 610 (FIG. 13), the ceramic core structure 1304 may be formed similarly to the ceramic core structure 612 (FIG. 13) or the ceramic core structure 1002 (FIGS. 17-19), and the CMC face sheets 1306 and 1308 may be formed similarly to the CMC face sheets 614 and 616 (FIG. 13) or the CMC face sheets 904 and 906 (FIG. 16) or the CMC face sheets 1004 and 1006 (FIGS. 17-19).

In the illustrated embodiment, the ceramic composite component 1300 has a first end 1310 and a second end 1312. Similar to the ceramic composite components 600, 900, 1000, 1100, and 1200 (FIGS. 13-19), the ceramic composite component 1300 comprises a tapered configuration such that the ceramic core structure 1302, the ceramic core structure 1304, and the CMC face sheets 1306 and 1308 taper inwardly toward each other from the first end 1310 toward the second end 1312. In the illustrated embodiment, the ceramic core structure 1302 includes a first end 1314 coincident with the first end 1310 of the ceramic composite component 1300, and a second end 1316 distally located from the first end 1314 toward the second end 1312. The ceramic core structure 1304 includes a first end 1318 located adjacent to or abutting the second end 1316 of the ceramic core structure 1302, and a second end 1320 distally located from the first end 1318 toward the second end 1312.

In the illustrated embodiment, the ceramic composite component 1300 also includes a CMC filler sheet 1322. In exemplary embodiments, the CMC filler sheet 1322 is disposed between portions of the CMC face sheets 1306 and 1308 that extend beyond the second end 1320 of the ceramic core structure 1304. In other words, a portion 1324 of the CMC face sheet 1306 and a portion 1326 of the CMC face sheet 1308 each extend beyond the second end 1320 of the ceramic core structure 1304 to the second end 1312 of the ceramic composite component 1300. The CMC filler sheet 1322 is located adjacent to or abutting the second end second end 1320 of the ceramic core structure 1304 and terminates distally from the second end second end 1320 of the ceramic core structure 1304 coincident with ends of the CMC face sheets 1306 and 1308 at the second end 1312 of the ceramic composite component 1300. The CMC filler sheet 1322 may be formed similarly to the CMC face sheets 1306 and 1308 such that the CMC filler sheet 1322 is formed from a quantity of CMC plies.

Figure 21:
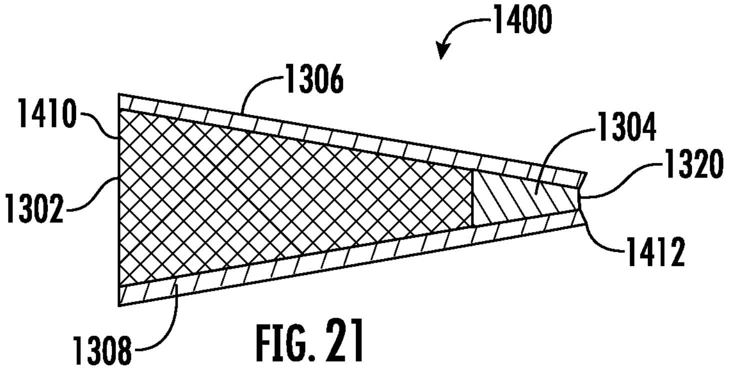
FIG. 21 is a schematic cross-sectional view of another exemplary ceramic composite component in accordance with an embodiment of the present disclosure.

FIG. 21 is a schematic view of another exemplary ceramic composite component 1400 in accordance with an embodiment of the present disclosure. In exemplary embodiments, the ceramic composite component 1400 may be formed similarly to the ceramic composite component 1300 (FIG. 20). In exemplary embodiments, the ceramic composite component 1400 comprises the ceramic core structure 1302, the ceramic core structure 1304, and the CMC face sheets 1306 and 1308.

In the illustrated embodiment, the ceramic composite component 1400 has a first end 1410 and a second end 1412. Similar to the ceramic composite components 600, 900, 1000, 1100, and 1200 (FIGS. 13-19), the ceramic composite component 1400 comprises a tapered configuration such that the ceramic core structure 1302, the ceramic core structure 1304, and the CMC face sheets 1306 and 1308 taper inwardly toward each other from the first end 1410 toward the second end 1412. In the illustrated embodiment, the CMC face sheets 1306 and 1308 terminate at the second end 1412 coincident with the second end 1320 of the ceramic core structure 1304, thereby leaving at least a portion of the ceramic core structure 1304 at the second end 1412 exposed.

Figure 22:
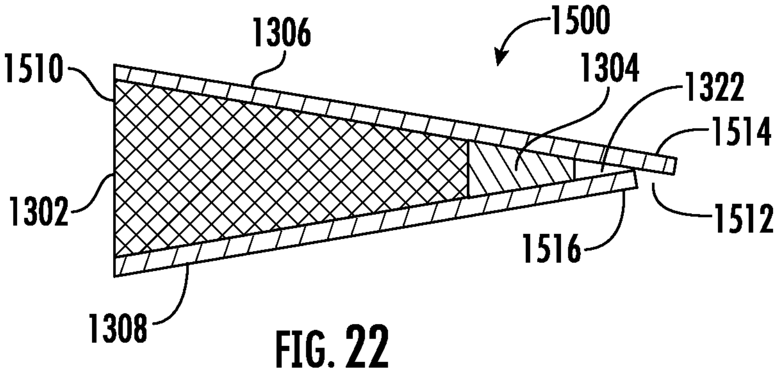
FIG. 22 is a schematic cross-sectional view of another exemplary ceramic composite component in accordance with an embodiment of the present disclosure.

FIG. 22 is a schematic view of another exemplary ceramic composite component 1500 in accordance with an embodiment of the present disclosure. In exemplary embodiments, the ceramic composite component 1500 may be formed similarly to the ceramic composite component 1300 (FIG. 20). In exemplary embodiments, the ceramic composite component 1500 comprises the ceramic core structure 1302, the ceramic core structure 1304, the CMC face sheets 1306 and 1308, and the CMC filler sheet 1322.

In the illustrated embodiment, the ceramic composite component 1500 has a first end 1510 and a second end 1512. Similar to the ceramic composite components 600, 900, 1000, 1100, 1200, 1300, and 1400 (FIGS. 13-21), the ceramic composite component 1500 comprises a tapered configuration such that the ceramic core structure 1302, the ceramic core structure 1304, and the CMC face sheets 1306 and 1308 taper inwardly toward each other from the first end 1510 toward the second end 1512. In the illustrated embodiment, the CMC face sheets 1306 and 1308 end or terminate at the second end 1512 of the ceramic composite component 1500 such that at least a portion of one of the CMC face sheets 1306 or 1308 laps or overlaps at least a portion of the other CMC face sheet 1306 or 1308. For example, in the illustrated embodiment, a portion 1514 of the CMC face sheet 1306 laps or overlaps a portion 1516 of the CMC face sheet 1308 at the second end 1512 of the ceramic composite component 1500.

Although not depicted in the embodiments illustrated in FIGS. 13-22, it should be understood that each respective ceramic composite component of FIGS. 13-22 may also include one or more CMC structures bonded to a respective ceramic core structure. For example, the ceramic composite component 600 of FIG. 13 may have the CMC structure 206 (FIGS. 4, 5, and 12) bonded to an internal portion of the ceramic core structure 610 (FIG. 13) similar to the ceramic composite component 200 (FIGS. 4-9). Thus, it should be understood that the CMC structure 206 (FIGS. 4, 5, and 12) may be included in each of the respective ceramic composite components 600, 700, 800, 900, 1000, 1100, 1200, 1300, 1400, and 1500 of FIGS. 13-22 similar to the ceramic composite component 200 (FIGS. 4-9).

Figure 23:
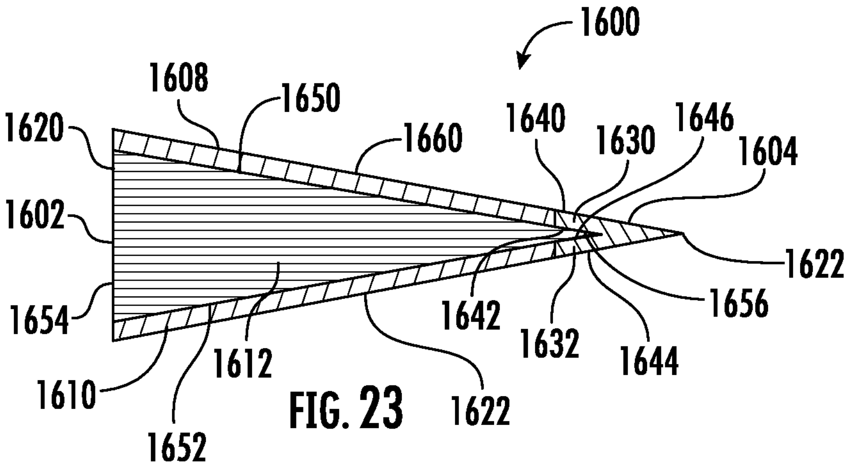
FIG. 23 is a schematic cross-sectional view of another exemplary ceramic composite component in accordance with an embodiment of the present disclosure.

FIG. 23 is a schematic view of another exemplary ceramic composite component 1600 in accordance with an embodiment of the present disclosure. In the illustrated embodiment, the ceramic composite component 1600 comprises a CMC structure 1602, a ceramic core cap 1604, and CMC face sheets 1608 and 1610. The CMC face sheets 1608 and 1610 may be formed similarly to the CMC face sheets 614 and 616 (FIG. 13). The CMC structure 1602 comprises a quantity of CMC plies 1612 and may be formed similarly to the CMC face sheets 614 and 616 (FIG. 13) such that the quantity of CMC plies 1612 undergo thermal processing, such as a cure or burn-out to yield a high char residue in the preform, and subsequent chemical processing, such as melt-infiltration with silicon, to arrive at a component formed of a CMC material having a desired chemical composition. The CMC plies 1612 may be laid up having a desired geometry for the resulting CMC structure 1602 or the CMC structure 1602 may be cut or machined to a desired geometry after thermal and chemical processing.

In exemplary embodiments, the ceramic core cap 1604 may be formed similarly to the ceramic core structure 612 (FIG. 13) such that the ceramic core cap 1604 comprises an additively manufactured solid core using monolithic SiC. In the illustrated embodiment, the ceramic composite component 1600 has a first end 1620 and a second end 1622. Similar to the ceramic composite components 600, 900, 1000, 1100, 1200, 1300, 1400, and 1500 (FIGS. 13-22), the ceramic composite component 1600 comprises a tapered configuration such that the CMC structure 1602, the ceramic core cap 1604, and the CMC face sheets 1608 and 1610 taper inwardly toward each other from the first end 1620 toward the second end 1622.

In the illustrated embodiment, the ceramic core cap 1604 comprises an arm 1630 and an arm 1632 forming or defining a V-shaped ceramic core cap 1604. In the illustrated embodiment, the arm 1630 defines an outer surface 1640 of the ceramic core cap 1604 and an inner surface 1642 of the ceramic core cap 1604. The arm 1632 defines an outer surface 1644 of the ceramic core cap 1604 and an inner surface 1646 of the ceramic core cap 1604. The CMC structure 1602 comprises a surface 1650 and a surface 1652 each extending from a first end 1654 of the CMC structure 1602 to a second end 1656 of the CMC structure 1602. In the illustrated embodiment, the arms 1630 and 1632 define an acute angle relative to each other disposed facing toward the CMC structure 1602 such that the second end 1656 of the CMC structure 1602 is received within the V-shaped opening defined by the arms 1630 and 1632. The CMC face sheet 1608 defines a surface 1660, and the CMC face sheet 1610 defines a surface 1662.

In the illustrated embodiment, the arm 1630 is configured or formed having a thickness as measured between the outer surface 1640 and the inner surface 1642 corresponding to a thickness of the CMC face sheet 1608 as measured between the surface 1650 and the surface 1660. Additionally, the arm 1632 is configured or formed having a thickness as measured between the outer surface 1644 and the inner surface 1646 corresponding to a thickness of the CMC face sheet 1610 as measured between the surface 1652 and the surface 1662. Thus, when assembled, the outer surface 1640 aligns with or is otherwise flush with the surface 1660, and the outer surface 1644 aligns with or is otherwise flush with the surface 1662. Thus, the outer surface 1640 and the surface 1660 form an aerodynamic surface, and the outer surface 1644 and the surface 1662 form an aerodynamic surface.

In an assembled configuration, the ceramic core cap 1604 is disposed over and bonded to the second end 1656 of the CMC structure 1602, and the CMC face sheets 1608 and 1610 are disposed over and bonded to the respective surface 1650 and surface 1652 and the respective arms 1630 and 1632. In exemplary embodiments, the CMC face sheets 1608 and 1610 are disposed over the respective surface 1650 and surface 1652 such that the CMC plies 1612 forming the respective CMC face sheets 1608 and 1610 terminate adjacent to or abut the respective arm 1630 and arm 1632. For ease of description and illustration, the pliable matrix material 490 (FIG. 12) is not depicted in FIG. 23. However, it should be understood that the pliable matrix material 490 (FIG. 12) may be used to bond the ceramic core cap 1604, the CMC structure 1602, and the CMC face sheets 1608 and 1610 to each other. In exemplary embodiments, the pliable matrix material 490 (FIG. 12) may be applied to one or more interfaces where the ceramic core cap 1604, the CMC structure 1602, and the CMC face sheets 1608 and 1610 are adjacent to or abut each other. Thus, in exemplary embodiments, the pliable matrix material 490 (FIG. 12) may be applied between the inner surface 1642 and the surface 1650, between the inner surface 1646 and the surface 1652, between the arm 1630 and the CMC face sheet 1608, between the arm 1632 and the CMC face sheet 1610, between the CMC face sheet 1608 and the surface 1650, and between the CMC face sheet 1610 and the surface 1652. The assembled ceramic core cap 1604, the CMC structure 1602, and the CMC face sheets 1608 and 1610 may then undergo thermal processing, such as a cure or burn-out and subsequent chemical processing, such as melt-infiltration with silicon, to arrive at the ceramic composite component 1600.

Figure 24:
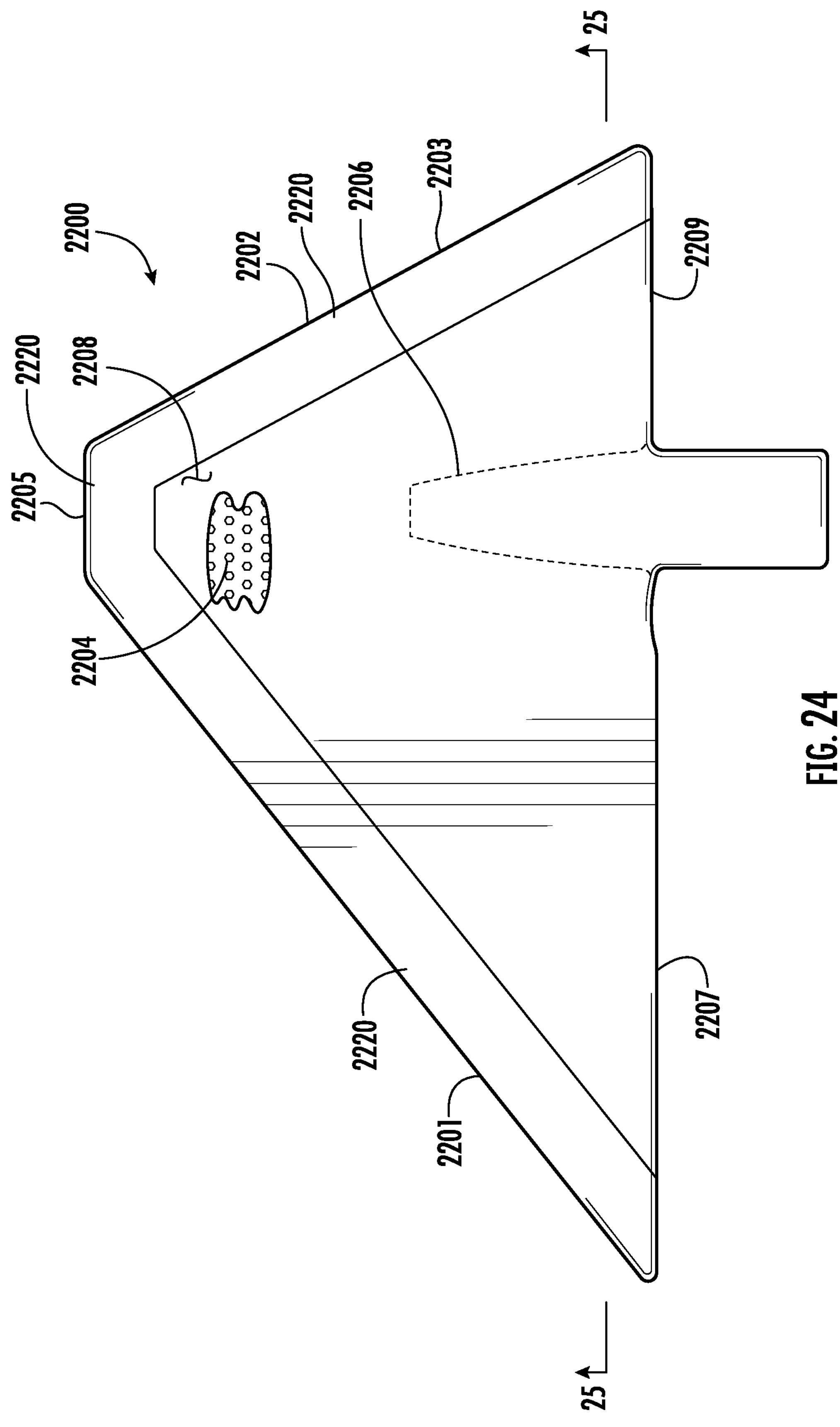
FIG. 24 is a schematic, plan view of an exemplary ceramic composite component in accordance with another embodiment of the present disclosure.

FIG. 24 is a schematic, plan view of an exemplary ceramic composite component 2200 in accordance with an embodiment of the present disclosure. In FIG. 24, the ceramic composite component 2200 is depicted in an assembled configuration, and the ceramic composite component 2200 is in the form of a tail fin 2202. For example, the tail fin 2202 may be used on or otherwise form part of the aircraft 10 depicted in FIGS. 1 and 2. For example, the tail fin 2202 may have a leading edge 2201, a trailing edge 2203, and one or more side edges 2205, 2207, and 2209. However, it should be understood that other types of control surfaces or control surface structures, or other types of structures and components in general, may be formed without departing from the present disclosure. In the illustrated embodiment, the ceramic composite component 2200 includes a ceramic core structure 2204, a CMC structure 2206 bonded to the ceramic core structure 204, one or more CMC face sheets 2208 disposed over and bonded to the ceramic core structure 2204 and the CMC structure 2206, and one or more ceramic core structures 2220 defining one or more of its edges (e.g., the leading edge 2201, the trailing edge 2203, and the side edge 2205. In the illustrated embodiment, the CMC structure 2206 extends outwardly beyond the side edges 2207 and 2209 to facilitate the coupling of the tail fin 2202 to another structure.

In exemplary embodiments, the ceramic core structure 2204 may be formed similarly to the ceramic core structure 204 (FIGS. 4-9). In exemplary embodiments, the CMC structure 2206 may be formed similarly to the CMC structure 206 (FIGS. 4, 5, and 12), the CMC structure 300 (FIG. 10), or the CMC structure 390 (FIG. 11). In exemplary embodiments, the one or more CMC face sheets 2208 may be formed similarly to the CMC face sheet 2208 (FIGS. 4, 5, and 12).

Figure 25:
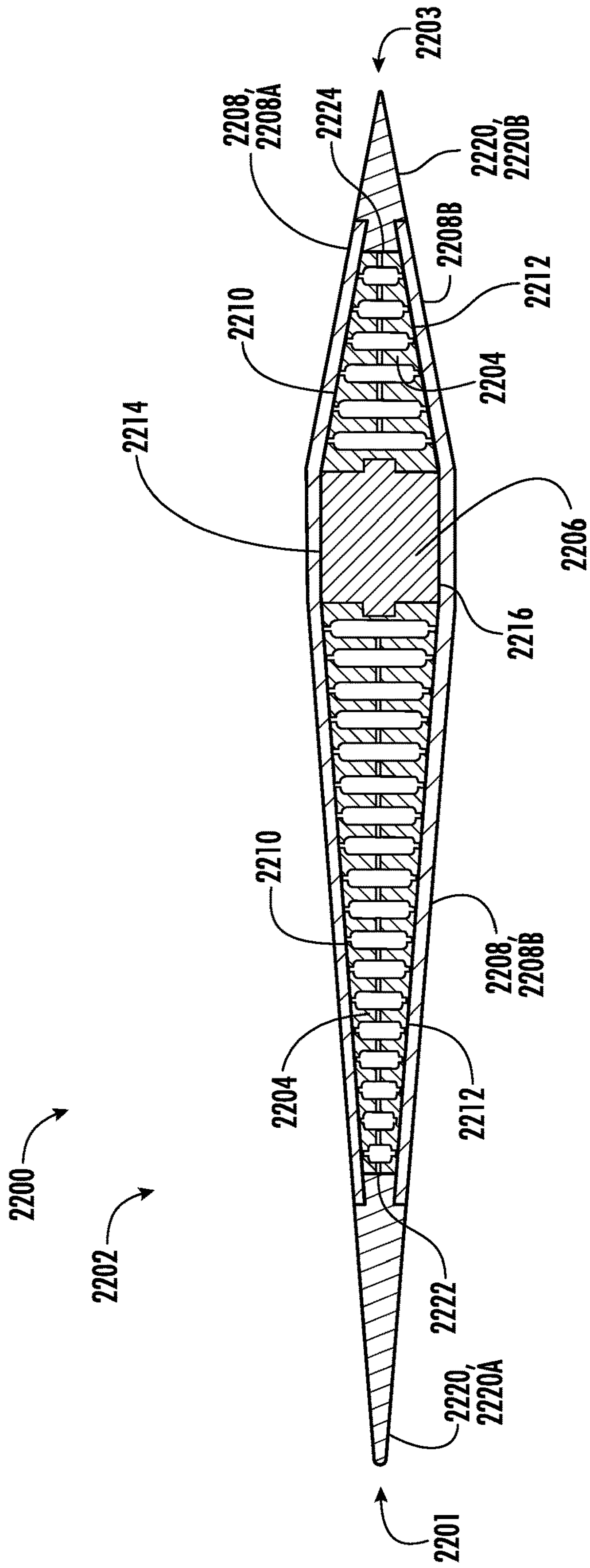
FIG. 25 is a schematic, cross-sectional view of the exemplary ceramic composite component of FIG. 24 taken along the line 25-25 of FIG. 24 in accordance with an embodiment of the present disclosure.

FIG. 25 is a schematic, cross-sectional view of the exemplary ceramic composite component 2200 of FIG. 24 taken along the line 25-25. In the embodiment illustrated in FIG. 25, the one or more CMC face sheets 2208 include a CMC face sheets 2208A and a CMC face sheets 2208B. The CMC face sheet 2208A is bonded to a side 2210 of the ceramic core structure 2204. For illustrative purposes and case of clarity, the side 2210 may also be referred to as the top side 2210. The CMC face sheet 2208B is bonded to a side 2212 of the ceramic core structure 2204. For illustrative purposes and ease of clarity, the side 2212 may also be referred to as the bottom side 2212. The CMC face sheet 2208A is also bonded to a side 2214 of the CMC structure 2206. For illustrative purposes and ease of clarity, the side 2214 of the CMC structure 2206 is also referred to as the top side 2214 of the CMC structure 2206. The CMC face sheet 2208B is also bonded to a side 2216 of the CMC structure 2206. For illustrative purposes and ease of clarity, the side 2216 of the CMC structure 2206 is also referred to as the bottom side 2216 of the CMC structure 2206. In exemplary embodiments, the ceramic core structure 2204, the CMC structure 2206, and the CMC face sheets 2208A and 2208B are assembled and bonded together to form the ceramic composite component 2200 similarly as the ceramic core structure 204, the CMC structure 206, and the CMC face sheets 208 are assembled and bonded together to form the ceramic composite component 200 as depicted and described in connection with FIGS. 4, 5, and 12.

In the illustrated embodiment, the ceramic composite component 2200 is configured having one or more of the ceramic core structures 2220 defining one or more of its edges. For example, in the illustrated embodiment, the leading edge 2201 and the trailing edge 2203 are each configured having a respective ceramic core structure 2220A and 2220B. In exemplary embodiments, the respective ceramic core structures 2220A and 2220B are formed similarly to the ceramic core structure 612 of FIG. 13. For example, the ceramic core structures 2220A and 2220B comprise additively manufactured ceramic core structures 2220A and 2220B. In exemplary embodiments, the ceramic core structures 2220A and 2220B are solid ceramic core structures 2220A and 2220B. In exemplary embodiments, the ceramic core structures 2220A and 2220B are monolithic ceramic core structures 2220A and 2220B. In exemplary embodiments, the ceramic core structures 2220A and 2220B are made of Si or SiC. In exemplary embodiments, the ceramic core structures 2220A and 2220B may be formed similarly to the ceramic core structure 204 (FIGS. 4-9) except as a solid, non-cellular structure. Thus, in exemplary embodiments, the ceramic core structures 2220A and 2220B may be additively manufactured as part of the ceramic core structure 2204 (e.g., the ceramic core structure 2204 additively manufactured to integrally include the ceramic core structures 2220A and 2220B as a single, unitary, monolithic, additively manufactured component such that the solid ceramic core structures 2220A and 2220B extend outwardly from the ceramic core structure 2204 portion to define a corresponding edge). Thus, in exemplary embodiments, the ceramic core structures 2220A and 2220B extend outwardly from respective sides 2222 and 2224 of the ceramic core structure 2204 (e.g., the sides 2222 and 2224 representing one or more walls of a cellular ceramic core structure 2204) to define the respective leading edge 2201 and trailing edge 2203 of the ceramic composite component 2200. Alternatively, the ceramic core structures 2220A and 2220B may be separately formed and bonded to the ceramic core structure 2204 (e.g., separately additively manufactured and bonded to the respective sides 2222 and 2224 of the ceramic core structure 2204). Further, it should be understood that the ceramic core structure 2204, the ceramic core structures 2220A and 2220B, and the respective CMC face sheets 2208A and 2208B may be assembled or bonded together similarly as the ceramic core structure 611, the ceramic core structure 612, and the CMC face sheets 614 and 616 are assembled and bonded together to form the ceramic composite component 600 as depicted and described in FIG. 13.

In the illustrated embodiment, the leading edge 2201 and the trailing edge 2203 are configured having the respective ceramic core structures 2220A and 2220B. However, additionally or alternatively, the ceramic core structure 2220 may be included at other edges of the ceramic composite component 2200 or omitted at certain edges (e.g., included only on the leading edge 2201). Further, it should be understood that one or more edges of the ceramic composite component 2200 may be configured as depicted and described as set forth in any of the ceramic composite component embodiments of FIGS. 14-19.

Figure 26:
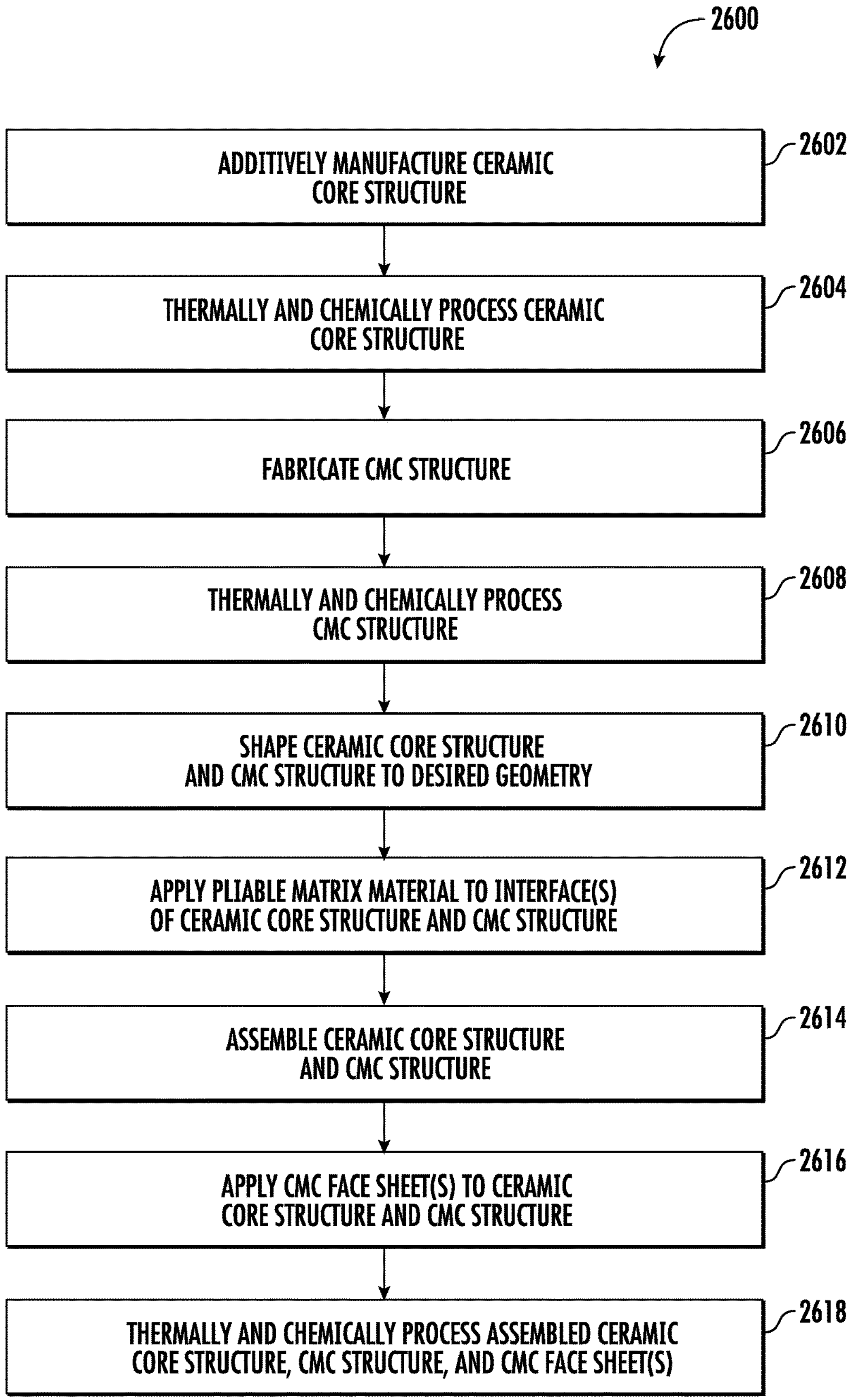
FIG. 26 is a flow chart diagram of an exemplary method for forming a ceramic composite component in accordance with the present disclosure.

Referring now to FIG. 26, a flowchart outlining steps for a method for forming a ceramic composite component, such as the ceramic composite component 200 (FIGS. 4 and 5) (hereinafter, "method 2600") is provided. The method includes, at 2602, additively manufacturing a ceramic structured honeycomb core component, such as the ceramic core structure 204 (FIGS. 5-9). At 2604, the ceramic structured honeycomb core component additively manufactured at step 2602 is thermally and chemically processed (e.g., pyrolysis and melt-infiltration). At 2606, the method includes laying up or fabricating a CMC structure, such as the CMC structure 206 (FIGS. 5 and 12 (which may comprise fabricating the CMC structure 300 (FIG. 10) or the CMC structure 390 (FIG. 11)). At 2608, the CMC structure fabricated at step 2606 is thermally and chemically processed (e.g., pyrolysis and melt-infiltration). At 2610, the additively manufactured ceramic structured honeycomb core component fabricated at steps 2602 and 2604 and the CMC structure fabricated at steps 2606 and 2608 may be cut or machined to particular geometries. At 2612, a pliable matrix material, such as the pliable matrix material 490 (FIG. 12), is applied to various interface surfaces of the additively manufactured ceramic structured honeycomb core component and the CMC structure fabricated at steps 2602-2610. At 2614, the method includes assembling the additively manufactured ceramic structured honeycomb core component and the CMC structure fabricated at steps 2602-2610 to each other. In exemplary embodiments, the CMC structure 206 (FIGS. 5 and 12) is inserted into the recessed portion 254 (FIGS. 6 and 7) of the ceramic core structure 204 (FIGS. 6 and 7) such as illustrated in FIG. 12. At 2616, the method includes applying CMC plies to form one or more CMC face sheets over the assembled additively manufactured ceramic structured honeycomb core component and the CMC structure. For example, the CMC plies 500 (FIG. 12) are applied over the ceramic core structure 204 (FIG. 12) and the CMC structure 206 (FIG. 12) to form the CMC face sheet 208. At step 2618, the assembled CMC plies/CMC face sheet(s) with the assembled additively manufactured ceramic structured honeycomb core component and the CMC structure are thermally and chemically processed (e.g., pyrolysis and melt-infiltration).

Figure 27:
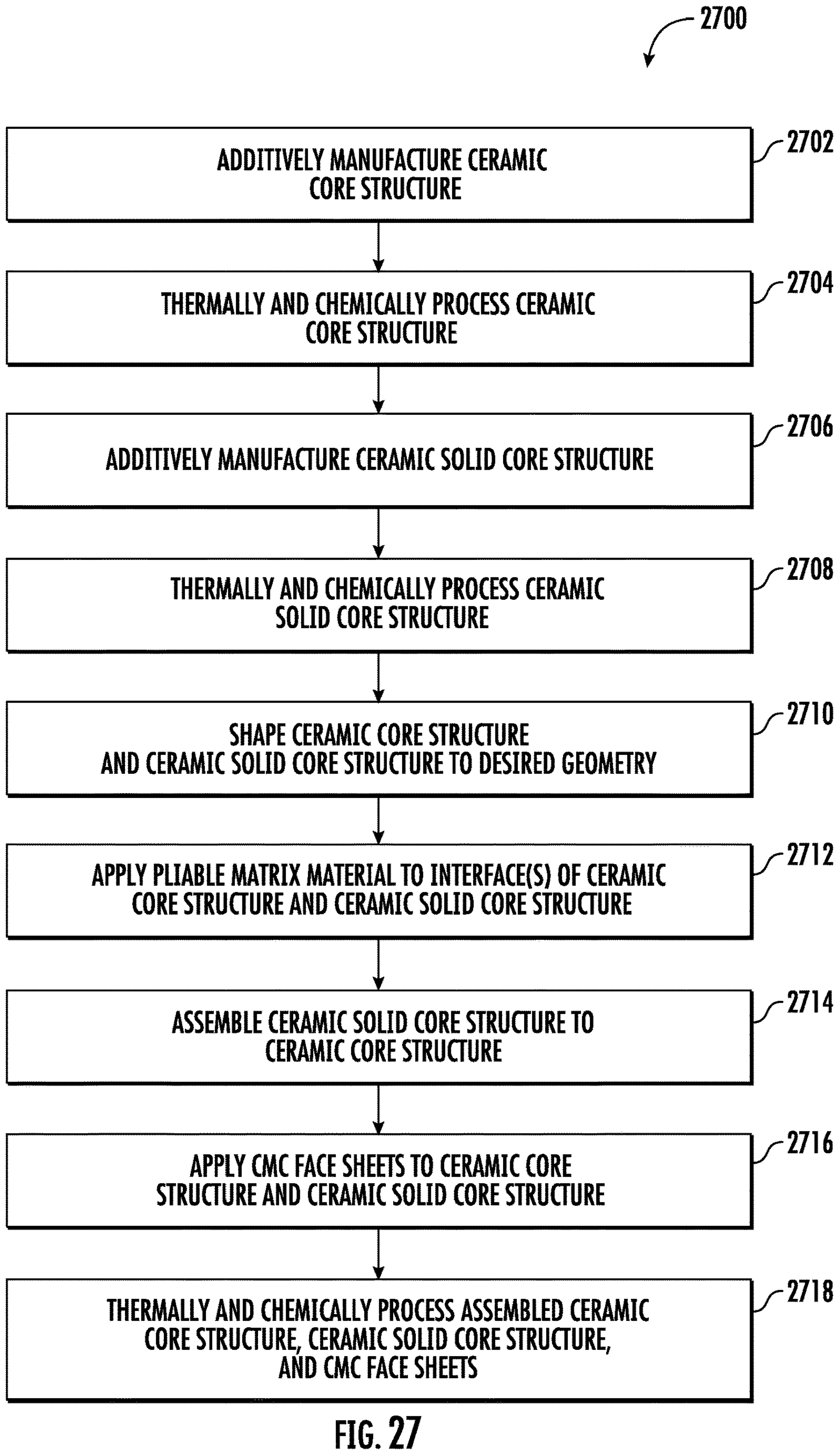
FIG. 27 is a flow chart diagram of another exemplary method for forming a ceramic composite component in accordance with the present disclosure.

Referring now to FIG. 27, a flowchart outlining steps for a method for forming a ceramic composite component, such as the ceramic composite component 600, 700, 800, 900, 1000, 1100, 1200, 1300, 1400, or 1500 (FIGS. 13-22) (hereinafter, "method 2700") is provided. The method includes, at 2702, additively manufacturing a ceramic core component, such as the ceramic core structure 610, 902, or 1302 (FIGS. 13-15 and 17-22). At 2704, the ceramic core structure additively manufactured at step 2702 is thermally and chemically processed (e.g., pyrolysis and melt-infiltration). At 2706, the method includes additively manufacturing a ceramic solid core component, such as the ceramic core structure 612, 1002, or 1304 (FIGS. 13-15 and 17-22). At 2708, the ceramic solid core component additively manufactured at step 2706 is thermally and chemically processed (e.g., pyrolysis and melt-infiltration). At 2710, the additively manufactured ceramic core structure fabricated at steps 2702 and 2704 and the additively manufactured ceramic solid core structure fabricated at steps 2706 and 2708 may be cut or machined to particular geometries. At 2712, a pliable matrix material, such as the pliable matrix material 490 (FIG. 12), is applied to various interface surfaces of the additively manufactured ceramic core structure and the additively manufactured ceramic solid core structure fabricated at steps 2702-2710.

At 2714, the method includes assembling the additively manufactured ceramic core structure and the additively manufactured ceramic solid core structure fabricated at steps 2702-2710 to each other. In exemplary embodiments, the ceramic core structure 610, 902, or 1302 (FIGS. 13-15 and 17-22) is disposed adjacent to or abutting the respective ceramic core structure 612, 1002, or 1304 (FIGS. 13-15 and 17-22) such as illustrated in FIGS. 13-15 and 17-22. At 2716, the method includes applying CMC plies to form one or more CMC face sheets over the additively manufactured ceramic core structure and the additively manufactured ceramic solid core structure assembled at step 2714. For example, CMC plies are applied over the respective ceramic core structure 610, 902, or 1302 (FIGS. 13-15 and 17-22) and respective ceramic core structure 612, 1002, or 1304 (FIGS. 13-15 and 17-22) to form the respective CMC face sheets 614, 616, 1004, 1006, 1306, or 1308 as depicted in FIGS. 13-15 and 17-22. At step 2718, the assembled CMC plies/CMC face sheet(s) with the additively manufactured ceramic core structure and the additively manufactured ceramic solid core structure are thermally and chemically processed (e.g., pyrolysis and melt-infiltration).

Figure 28:
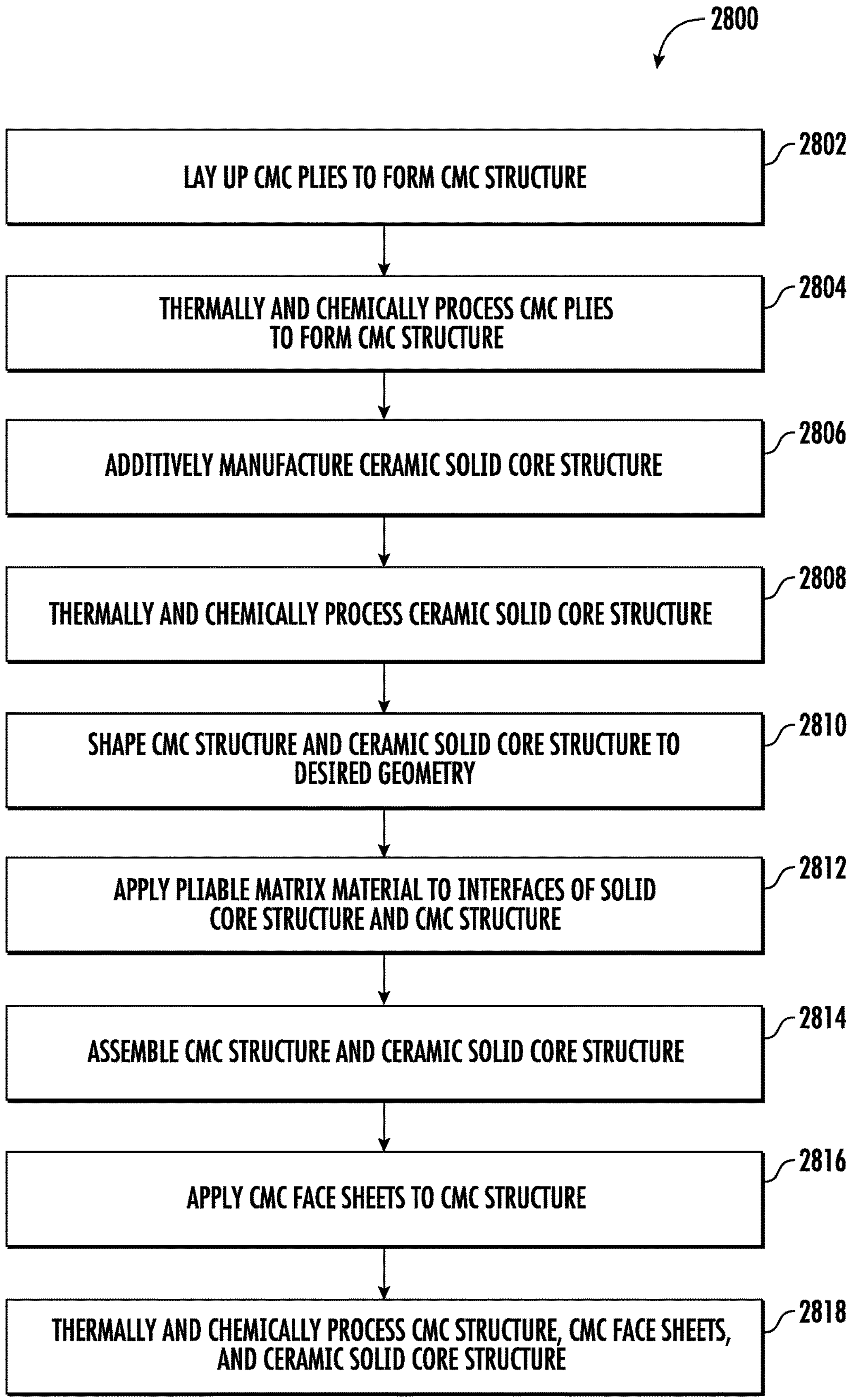
FIG. 28 is a flow chart diagram of another exemplary method for forming a ceramic composite component in accordance with the present disclosure.

Referring now to FIG. 28, a flowchart outlining steps for a method for forming a ceramic composite component, such as the ceramic composite component 1600 (FIG. 23) (hereinafter, "method 2800") is provided. The method includes, at 2802, laying up CMC plies (e.g., CMC plies 1612 (FIG. 23)) to form a CMC structure (e.g., the CMC structure 1602 (FIG. 23)). At 2804, the CMC plies laid up at step 2802 are thermally and chemically processed (e.g., pyrolysis and melt-infiltration) to form the CMC structure. At 2806, the method includes additively manufacturing a ceramic solid core structure, such as the ceramic core cap 1604 (FIG. 23).

At 2808, the ceramic solid core structure additively manufactured at step 2806 is thermally and chemically processed (e.g., pyrolysis and melt-infiltration). At 2810, the CMC structure fabricated at steps 2802 and 2804 and the additively manufactured ceramic solid core structure fabricated at steps 2806 and 2808 may be cut or machined to particular geometries. At 2812, a pliable matrix material, such as the pliable matrix material 490 (FIG. 12), is applied to various interface surfaces of the CMC structure and the additively manufactured solid core structure fabricated at steps 2802-2810.

At 2814, the method includes assembling the CMC structure and the additively manufactured ceramic solid core structure fabricated at steps 2802-2810 to each other. In exemplary embodiments, the CMC structure 1602 (FIG. 23) is disposed within or between the arm 1630 (FIG. 23) and the arm 1632 (FIG. 23) of the ceramic core cap 1604 (FIG. 23) such that the second end 1656 (FIG. 23) of the CMC structure 1602 (FIG. 23) is disposed adjacent to or abutting the V-shaped opening of the ceramic core cap 1604 (FIG. 23) defined by the arms 1630 and 1632 (FIG. 23). At 2816, the method includes applying CMC plies to form one or more CMC face sheets over the CMC structure assembled at step 2814. For example, CMC plies are applied over the CMC structure 1602 (FIG. 23) to form the respective CMC face sheets 1608 and 1610 (FIG. 23). At step 2818, the assembled CMC plies/CMC face sheet(s) with the CMC structure and the additively manufactured ceramic solid core structure are thermally and chemically processed (e.g., pyrolysis and melt-infiltration) to bond the assembled CMC plies/CMC face sheet(s) with the CMC structure and the additively manufactured ceramic solid core structure to each other.

Thus, embodiments of the present disclosure provide a ceramic composite component suitable for high-temperature and high-specific-stiffness applications including hypersonic aerodynamic control surfaces such as tail fins, flaps, flaperons, and elevons. In exemplary embodiments, a ceramic matrix component includes one or more monolithic core structures configured for multiple functionalities. High-temperature CMC layers are laminated to the monolithic core structure. The monolithic core structures may be a printed or machined or fabricated by other known means using a monolithic ceramic as a single- or multi-segmented core to achieve an overall aerodynamic structure. The core or the core segments may include regions of or features for integration and joining with CMC plies and elements within the structure for enhanced functional performance and reliability. In exemplary embodiments, a single-piece monolithic core may include: pockets and interlocking features for internal attachment or for placement of CMC plies or CMC inserts; aerodynamically shaped leading edges with interior edges for CMC face sheet ply arrangements; a backbone skeleton of differently shaped walls to manage local structural rigidity; and mating features to accommodate joining with the monolithic ceramic core structure.

Further aspects are provided by the subject matter of the following clauses:

A ceramic composite component, comprising: a ceramic core structure having a plurality of hollow cells defined by a plurality of walls extending from a first side of the ceramic core structure to a second side of the ceramic core structure, the second side opposite the first side; a ceramic matrix composite (CMC) structure coupled to the ceramic core structure, the CMC structure comprising a plurality of CMC plies, the CMC structure defined by a first side of the CMC structure and a second side of the CMC structure, the second side of the CMC structure opposite the first side of the CMC structure; a first CMC face sheet bonded to the first side of the ceramic core structure and the first side of the CMC structure; and a second CMC face sheet bonded to the second side of the ceramic core structure and the second side of the CMC structure.

The ceramic composite component of the preceding clause, wherein the CMC structure is bonded to the ceramic core structure.

The ceramic composite component of any preceding clause, wherein the CMC structure is bonded to the ceramic core structure using a pliable matrix material.

The ceramic composite component of any preceding clause, wherein the CMC structure is bonded to at least a portion of the plurality of walls of the ceramic core structure.

The ceramic composite component of any preceding clause, wherein the CMC structure is mechanically coupled to the ceramic core structure.

The ceramic composite component of any preceding clause, wherein the ceramic core structure includes an interlocking feature engaging a complementary interlocking feature formed on the CMC structure.

The ceramic composite component of any preceding clause, wherein the ceramic core structure comprises a first ceramic core structure, and further comprising a second ceramic core structure defining an edge of the ceramic composite component, the second ceramic core structure comprising a solid ceramic core structure.

The ceramic composite component of any preceding clause, wherein the first CMC face sheet is bonded to at least a first portion of the second ceramic core structure, and wherein the second CMC face sheet is bonded to at least a second portion of the second ceramic core structure.

The ceramic composite component of any preceding clause, wherein the first ceramic core structure is monolithically formed with the second ceramic core structure.

The ceramic composite component of any preceding clause, wherein at least one of the first CMC face sheet or the second CMC face sheet further defines the edge of the ceramic composite component.

The ceramic composite component of any preceding clause, wherein the second ceramic core structure extends from the first ceramic core structure.

The ceramic composite component of any preceding clause, wherein the second ceramic core structure is bonded to the first ceramic core structure.

The ceramic composite component of any preceding clause, wherein the second ceramic core structure comprises a tapered geometry.

The ceramic composite component of any preceding clause, wherein the CMC structure comprises a tapered geometry.

The ceramic composite component of any preceding clause, wherein the ceramic core structure comprises the first ceramic core structure, wherein the CMC structure includes a third ceramic core structure disposed between at least a portion of the plurality of CMC plies.

The ceramic composite component of any preceding clause, wherein the third ceramic core structure comprises at least one of a solid ceramic core structure, a porous ceramic core structure, or a structured honeycomb ceramic core structure.

The ceramic composite component of any preceding clause, wherein the first ceramic core structure is additively manufactured.

The ceramic composite component of any preceding clause, wherein the second ceramic core structure is additively manufactured.

The ceramic composite component of any preceding clause, wherein the third ceramic core structure is additively manufactured.

A method of forming a ceramic composite component, comprising: coupling a ceramic matrix composite (CMC) structure to a ceramic core structure, wherein the ceramic core structure comprises a plurality of hollow cells defined by a plurality of walls extending from a first side of the ceramic core structure to a second side of the ceramic core structure opposite the first side, and wherein the CMC structure comprises a plurality of CMC plies defining a first side of the CMC structure and a second side of the CMC structure opposite the first side of the CMC structure; bonding a first CMC face sheet to the first side of the ceramic core structure and the first side of the CMC structure; bonding a second CMC face sheet to the second side of the ceramic core structure and the second side of the CMC structure; and densifying and bonding together the first and second CMC face sheets, the ceramic core structure, and the CMC structure.

The method of the preceding clause, further comprising additively manufacturing the ceramic core structure.

The method of any preceding clause, further comprising applying a pliable matrix material to an interface of the ceramic core structure and the CMC structure.

The method of any preceding clause, further comprising forming the CMC structure having another ceramic core structure disposed between at least a portion of the plurality of CMC plies.

The method of any preceding clause, wherein the ceramic core structure comprises a first ceramic core structure, and further comprising a second ceramic core structure extending from the first ceramic core structure and defining an edge of the ceramic composite component, the second ceramic core structure comprising a solid ceramic core structure, and further comprising: bonding the first CMC face sheet to at least a first portion of the second ceramic core structure; and bonding the second CMC face sheet to at least a second portion of the second ceramic core structure.

The method of any preceding clause, further comprising bonding the second ceramic core structure to the first ceramic core structure.

A ceramic composite component, comprising: a first ceramic core structure having a plurality of hollow cells defined by a plurality of walls extending from a first side of the first ceramic core structure to a second side of the first ceramic core structure, the second side opposite the first side; a second ceramic core structure extending from the first ceramic core structure and defining an edge of the ceramic composite component, the second ceramic core structure comprising a solid ceramic core structure; a first CMC face sheet bonded to the first side of the first ceramic core structure and at least a first portion of the second ceramic core structure; and a second CMC face sheet bonded to the second side of the ceramic core structure and at least a second portion of the second ceramic core structure.

A method of assembling a ceramic composite component, comprising: applying a pliable matrix material to an interface of a ceramic core structure, wherein the ceramic core structure comprises a plurality of hollow cells defined by a plurality of walls extending from a first side of the ceramic core structure to a second side of the ceramic core structure opposite the first side; disposing a CMC structure against the interface of the ceramic core structure with the pliable matrix material therebetween, wherein the CMC structure comprises a plurality of CMC plies defining a first side of the CMC structure and a second side of the CMC structure opposite the first side of the CMC structure; disposing at least one CMC face sheet over the first and second sides of the ceramic core structure and the first and second sides of the CMC structure; and densifying and bonding together the at least one CMC face sheet, the pliable matrix material, the ceramic core structure, and the CMC structure.

The method of any preceding clause, further comprising additively manufacturing the ceramic core structure.

The method of any preceding clause, further comprising forming the CMC structure having another ceramic core structure disposed between at least a portion of the plurality of CMC plies.

The method of any preceding clause, further comprising forming the another ceramic core structure as at least one of a solid ceramic core structure, a porous ceramic core structure, or a structured honeycomb ceramic core structure.

The method of any preceding clause, wherein the ceramic core structure comprises a first ceramic core structure, and further comprising a second ceramic core structure bonded to the first ceramic core structure and defining an edge of the ceramic composite component, the second ceramic core structure comprising a solid ceramic core structure, and further comprising bonding the second ceramic core structure to the first ceramic core structure.

The method of any preceding clause, further comprising bonding the first CMC face sheet to at least a first portion of the second ceramic core structure, and bonding the second CMC face sheet to at least a second portion of the second ceramic core structure.

The method of any preceding clause, further comprising forming the second ceramic core structure comprising a tapered geometry.

The method of any preceding clause, further comprising forming the ceramic core structure having an interlocking feature engageable with a complementary interlocking feature formed on the CMC structure.

The method of any preceding clause, further comprising forming the ceramic core structure with at least one aperture extending from a first cell of the plurality of hollow cells to a second cell of the plurality of hollow cells.

A ceramic composite component, comprising: a first ceramic core structure defined by a first side extending from a first end of the first ceramic core structure to a second end of the first ceramic core structure, and wherein the first ceramic core structure is defined by a second side extending from the first end to the second end opposite the first side; a second ceramic core structure bonded to the second end of the first ceramic core structure, the second ceramic core structure defining a first recess positioned adjacent the first side of the first ceramic core structure and a second recess positioned adjacent the second side of the first ceramic core structure; a first CMC face sheet disposed over the first side of the first ceramic core structure and terminating within the first recess of the second ceramic core structure; and a second CMC face sheet disposed over the second side of the first ceramic core structure and terminating within the second recess of the second ceramic core structure.

The ceramic composite component of any preceding clause, wherein the first ceramic core structure comprises a tapered geometry.

The ceramic composite component of any preceding clause, wherein the second ceramic core structure comprises a tapered geometry.

The ceramic composite component of any preceding clause, wherein the second ceramic core structure is defined by a first side and a second side opposite the first side of the second ceramic core structure, wherein the first recess is recessed from the first side of the second ceramic core structure and the second recess is recessed from the second side of the second ceramic core structure, and wherein the first CMC face sheet is aligned with the first side of the second ceramic core structure and the second CMC face sheet is aligned with the second side of the second ceramic core structure.

The ceramic composite component of any preceding clause, further comprising at least one aperture extending from within the first ceramic core structure through at least one of the first CMC face sheet or the second CMC face sheet.

The ceramic composite component of any preceding clause, further comprising at least one aperture extending from within the first ceramic core structure through the second ceramic core structure.

The ceramic composite component of any preceding clause, wherein the first ceramic core structure comprises a plurality of hollow cells defined by a plurality of walls, and wherein the second ceramic core structure comprises a solid ceramic core structure.

The ceramic composite component of any preceding clause, wherein the plurality of hollow cells comprise a first cell and a second cell defined by a first wall of the plurality of walls therebetween, wherein the first wall includes at least one aperture extending from the first cell to the second cell.

A ceramic composite component, comprising: a first ceramic core structure having a plurality of hollow cells defined by a plurality of walls, wherein the first ceramic core structure is defined by a first side extending from a first end of the first ceramic core structure to a second end of the first ceramic core structure, and wherein the first ceramic core structure is defined by a second side opposite the first side, the second side extending from the first end to the second end; a second ceramic core structure bonded to the second end of the first ceramic core structure, the second ceramic core structure defined by a third side aligned with the first side, the second ceramic core structure defined by a fourth side aligned with the second side; a first CMC face sheet extending over and bonded to the first side and the third side; and second CMC face sheet extending over and bonded to the second side and the fourth side.

The ceramic composite component of any preceding clause, wherein the second ceramic core structure comprises a first end and a second end, the first end of the second ceramic core structure bonded to the second end of the first ceramic core structure.

The ceramic composite component of any preceding clause, wherein the first CMC face sheet and the second CMC face sheet each terminate at the second end of the second ceramic core structure.

The ceramic composite component of any preceding clause, wherein the first CMC face sheet overlaps the second CMC face sheet at the second end of the second ceramic core structure.

The ceramic composite component of any preceding clause, further comprising a CMC filler sheet bonded to the second end of the second ceramic core structure and disposed between the first CMC face sheet overlaps the second CMC face sheet.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ceramic composite component, comprising:

a ceramic core structure having a plurality of hollow cells defined by a plurality of walls extending from a first side of the ceramic core structure to a second side of the ceramic core structure, the second side opposite the first side;

a ceramic matrix composite (CMC) structure coupled to the ceramic core structure, the CMC structure comprising a plurality of CMC plies, the CMC structure defined by a first side of the CMC structure and a second side of the CMC structure, the second side of the CMC structure opposite the first side of the CMC structure;

a first CMC face sheet bonded to the first side of the ceramic core structure and the first side of the CMC structure; and a second CMC face sheet bonded to the second side of the ceramic core structure and the second side of the CMC structure, wherein the ceramic core structure defines a recessed portion extending inward from a perimeter sidewall of the ceramic core structure and is configured to receive at least a portion of the CMC structure.

2. The ceramic composite component of claim 1, wherein the CMC structure is bonded to the ceramic core structure.

3. The ceramic composite component of claim 1, wherein the CMC structure is bonded to the ceramic core structure using a pliable matrix material.

4. The ceramic composite component of claim 1, wherein the CMC structure is bonded to at least a portion of the plurality of walls of the ceramic core structure.

5. The ceramic composite component of claim 1, wherein the CMC structure is mechanically coupled to the ceramic core structure.

6. The ceramic composite component of claim 1, wherein the ceramic core structure comprises a first ceramic core structure, and further comprising a second ceramic core structure defining an edge of the ceramic composite component, the second ceramic core structure comprising a solid ceramic core structure.

7. The ceramic composite component of claim 6, wherein the first CMC face sheet is bonded to at least a first portion of the second ceramic core structure, and wherein the second CMC face sheet is bonded to at least a second portion of the second ceramic core structure.

8. The ceramic composite component of claim 7, wherein at least one of the first CMC face sheet or the second CMC face sheet further defines the edge of the ceramic composite component.

9. The ceramic composite component of claim 6, wherein the second ceramic core structure extends from the first ceramic core structure.

10. The ceramic composite component of claim 9, wherein the first ceramic core structure is monolithically formed with the second ceramic core structure.

11. The ceramic composite component of claim 9, wherein the second ceramic core structure is bonded to the first ceramic core structure.

12. The ceramic composite component of claim 6, wherein the second ceramic core structure defines a first recess positioned adjacent the first side of the first ceramic core structure, and wherein the first CMC face sheet terminates within the first recess.

13. The ceramic composite component of claim 12, wherein the second ceramic core structure defines a second recess positioned adjacent the second side of the first ceramic core structure and wherein the second CMC face sheet terminates within the second recess.

14. The ceramic composite component of claim 1, wherein the ceramic core structure comprises a first ceramic core structure, wherein the CMC structure includes a second ceramic core structure disposed between at least a portion of the plurality of CMC plies.

15. The ceramic composite component of claim 14, wherein the second ceramic core structure comprises at least one of a solid ceramic core structure, a porous ceramic core structure, or a structured honeycomb ceramic core structure.

16. The ceramic composite component of claim 1, wherein the ceramic core structure includes an interlocking feature engaging a complementary interlocking feature formed on the CMC structure.

17. A method of forming a ceramic composite component, comprising:

coupling a ceramic matrix composite (CMC) structure to a ceramic core structure, wherein the ceramic core structure comprises a plurality of hollow cells defined by a plurality of walls extending from a first side of the ceramic core structure to a second side of the ceramic core structure opposite the first side, and wherein the CMC structure comprises a plurality of CMC plies defining a first side of the CMC structure and a second side of the CMC structure opposite the first side of the CMC structure;

bonding a first CMC face sheet to the first side of the ceramic core structure and the first side of the CMC structure;

bonding a second CMC face sheet to the second side of the ceramic core structure and the second side of the CMC structure; and densifying and bonding together the first and second CMC face sheets, the ceramic core structure, and the CMC structure, wherein coupling the CMC structure to the ceramic core structure comprises disposing at least a portion of the CMC structure within a recessed portion extending inward from a perimeter sidewall of the ceramic core structure.

18. The method of claim 17, further comprising forming the CMC structure having another ceramic core structure disposed between at least a portion of the plurality of CMC plies.

19. The method of claim 17, wherein the ceramic core structure comprises a first ceramic core structure, and further comprising a second ceramic core structure defining an edge of the ceramic composite component, the second ceramic core structure comprising a solid ceramic core structure, and further comprising:

bonding the first CMC face sheet to at least a first portion of the second ceramic core structure; and bonding the second CMC face sheet to at least a second portion of the second ceramic core structure.

20. A ceramic composite component, comprising:

a first ceramic core structure having a plurality of hollow cells defined by a plurality of walls extending from a first side of the first ceramic core structure to a second side of the first ceramic core structure, the second side opposite the first side;

a second ceramic core structure extending from the first ceramic core structure and defining an edge of the ceramic composite component, the second ceramic core structure comprising a solid ceramic core structure;

a first CMC face sheet bonded to the first side of the first ceramic core structure and at least a first portion of the second ceramic core structure; and a second CMC face sheet bonded to the second side of the ceramic core structure and at least a second portion of the second ceramic core structure, wherein the first ceramic core structure defines a recessed portion extending inward from a perimeter sidewall of the first ceramic core structure and configured to receive at least a portion of the second ceramic core structure.

* * * * *